(12) United States Patent
Metzger

(10) Patent No.: US 11,859,357 B1
(45) Date of Patent: Jan. 2, 2024

(54) SNOW OAR FOR MANUALLY CLEARING SNOW AND ICE

(71) Applicant: Michael Anthony Metzger, Olney, MD (US)

(72) Inventor: Michael Anthony Metzger, Olney, MD (US)

( * ) Notice: Subject to any disclaimer, the term of this patent is extended or adjusted under 35 U.S.C. 154(b) by 474 days.

(21) Appl. No.: 16/377,387

(22) Filed: Apr. 8, 2019

Related U.S. Application Data

(60) Provisional application No. 62/654,371, filed on Apr. 7, 2018.

(51) Int. Cl.
*E01H 5/02* (2006.01)
*A01B 1/22* (2006.01)
*A01B 1/02* (2006.01)
*E01H 5/06* (2006.01)

(52) U.S. Cl.
CPC ............... *E01H 5/02* (2013.01); *A01B 1/02* (2013.01); *A01B 1/22* (2013.01); *E01H 5/061* (2013.01)

(58) Field of Classification Search
CPC .. E01H 5/02; E01H 5/061; A01B 1/02; A01B 1/22
See application file for complete search history.

(56) References Cited

U.S. PATENT DOCUMENTS

| | | | |
|---|---|---|---|
| 200,152 A | 2/1878 | Searle | |
| 239,205 A | 3/1881 | Vosburgh | |
| 316,509 A | 4/1885 | Watson | |
| 2,598,952 A * | 6/1952 | Weingart | E01H 5/02 294/54.5 |
| 3,804,451 A * | 4/1974 | Burke | E01H 5/02 37/285 |
| 4,173,835 A | 11/1979 | Burrell | |
| 4,783,105 A * | 11/1988 | Schulz | A01B 1/02 294/54.5 |
| D314,318 S * | 2/1991 | Uimonen | D8/10 |
| 4,996,834 A | 3/1991 | Geist | |
| 6,003,915 A | 12/1999 | Bierman | |
| 6,018,894 A | 2/2000 | Whitehead | |
| D474,082 S | 5/2003 | Leiser | |
| D565,366 S * | 4/2008 | Buscher | D8/10 |

(Continued)

FOREIGN PATENT DOCUMENTS

CA 2417854 A1 7/2004

*Primary Examiner* — Jamie L McGowan
(74) *Attorney, Agent, or Firm* — Law Office of Oliver Edwards LLC; Oliver Edwards

(57) ABSTRACT

An implement for manually clearing snow, slush, or ice comprises an elongated handle and relatively narrow, shallowly curved blade and can permit a standing stationary operator to drive or otherwise draw the front face of the blade more or less face-on into fallen snow, slush, or ice to manually plow, propel, launch or otherwise move snow to a spot remote from the operator in a lateral direction outwardly away from the User, for example forward, sideways, or rearward. The implement can also be employed wherein the blade skims the pavement at a shallow angle permitting a rapid pushing motion to send a charge ballistically ahead of the blade to a distant spot and can also be employed in a traditional shoveling mode. The implement can clear open or narrow spaces, wide or narrow steps with or without parapet walls, rails, or other barriers, and it can be economically produced.

17 Claims, 17 Drawing Sheets

(56) References Cited

U.S. PATENT DOCUMENTS

| | | | |
|---|---|---|---|
| D608,610 S * | 1/2010 | Boies | D8/7 |
| D773,261 S * | 12/2016 | Ward | D8/10 |
| 2011/0099765 A1* | 5/2011 | Youssefieh | A46B 5/005 |
| | | | 16/430 |
| 2012/0235432 A1 | 9/2012 | McCartin | |
| 2015/0091314 A1* | 4/2015 | Putre | E01H 5/02 |
| | | | 294/51 |
| 2016/0128260 A1* | 5/2016 | Adams | E01H 5/02 |
| | | | 294/51 |
| 2016/0215465 A1* | 7/2016 | Reid | A46B 15/0055 |
| 2020/0040539 A1* | 2/2020 | Smith | A47L 13/12 |

* cited by examiner

SNOW OAR FOR MANUALLY CLEARING SNOW AND ICE

BACKGROUND OF THE INVENTION

Field of the Invention

The need to move snow or other materials from one location to another is almost as old as the hills. Various tools such as snow shovels, snow plows, and snow blowers have been and are being employed to accomplish this goal. The present invention relates to an implement used to manually move light shovellable materials such as snow, slush, ice and other light aggregate material such as sand or grain. More particularly an implement is disclosed comprising an elongated handle and a relatively narrow arcuately curved blade member affixed to one end of the handle. The implement is intended to permit a standing operator to manually plow, propel, send, launch, eject, fling, or otherwise move snow or other light shovellable materials to a location at some distance from the operator. In one embodiment, the blade's relatively narrow width and arcuate curvature and the relatively long length of the handle can permit a User to, by manually manipulating the handle, relatively rapidly pull, push, swing, sweep, or otherwise drive or draw the front face of the blade more or less face-on into and through fallen snow to, for example, plow, propel, send, launch, eject, fling, or otherwise move the snow in virtually any more or less lateral direction, that is in a direction outwardly and away from the User, for example forward, sideways, or rearward away from the User while the User remains in a more or less upright and stationary or semi-stationary standing position. The implement can also be employed in a pusher mode where the User pushes the implement so the blade rides along the ground at a more shallow angle to the ground and in this mode, again due to the narrowness of the blade, and long handle, can permit a relatively rapid and extended, pushing motion, even if the User is in a stationary or semi-stationary standing stance, and even into dense snow or slush, which can send a charge of snow or slush ballistically ahead of the blade to a distant resting spot ahead of the blade.

The disclosed implement can also be employed in a traditional shoveling mode.

Related Art

A traditional snow shovel possesses a short, straight handle usually of wood, aluminum, steel, or plastic with a wide and slightly curved, corrugated and rib reinforced blade typically constructed of aluminum or of a molded plastic (e.g. U.S. Pat. No. 4,149,744 to D. R. Bonnes, 1979). The typical traditional snow shovel is generally designed to shovel a relatively large volume, or charge, of snow with each shoveling cycle.

Some snow shovel designs employ an "ergonomic" bend, offset, or Z-jogged handle (for example U.S. Pat. No. 3,078,604 to E. Neuman, 1963) which lowers the angle of the blade relative to the User so the blade generally lies almost parallel to the pavement such that a User can then, via manual manipulation of the handle, drive or thrust the blade at a shallow angle under a charge of snow to scoop it up and then lift the charge of shoveled snow—all without the need to bend down to the degree required with a straight handled shovel, and which bending while lifting is attended with more risk of physical exhaustion and back injury. Nevertheless, the Z-jogged handle shovel is designed for a discontinuous shoveling action involving scooping up a relatively large charge of snow, lifting it, then tossing it, or walking it to another spot and dumping or tossing the charge with each shoveling cycle. Further, the face of the typical blade possesses such large length and width dimensions, commensurate with a typical snow shovel, that considerable effort may be required to lift the blade with a full charge.

Another type of commonly used snow shovel is a "Pusher" type shovel (for example U.S. Pat. No. 4,199,181 to Mason, 1978; U.S. Pat. No. 4,597,204 to Heiden, 1986; U.S. D363,653 to Tisbo and Whitehead, 1995) and the typical pusher shovel possesses a blade of relatively large width and relatively low height. Pusher type manual snow plows and pusher type shovels operate by pushing a bluntly or obliquely oriented wide blade more or less face-on thru snow in a snow-plow like fashion, however this motion takes place at a relatively slow speed and tends to simply push, and not eject, the snow ahead of the blade. With a pusher type shovel snow builds up in an appreciable pile in front of the moving blade at which point the snow is simply being pushed to the immediate perimeter of an area being cleared. This does not place the snow far away from the User and can present a problem of leaving piles of dense, compacted, heavier snow accumulating at the perimeter of the space being cleared and can impede moving more snow to the side if large areas are being cleared or the snow is deep. If this is not acceptable, the piled snow must be located further away using another method. Further, a pusher type snow shovel has limited or little utility when snow is relatively deep or when snow is in a cramped or narrow space such as, for example, the steps of a long entryway or a porch stairway and especially one with parapet or sidewalls.

A snow shovel entitled "Snow Flipper" (U.S. Pat. No. 4,783,105 to S. L. Schulz, 1988) has a long handle and squarish flat-bottomed dust-pan shaped blade which is sized to limit "the volume and weight carrying capacity due to its dimensioning" and "the handle unit and shovel blade unit are capable of being 'flexed' backwardly and 'flipped' forwardly in the act of shoveling snow or slush". The Flipper was "designed to allow its User to shovel snow standing in an upright position without having to bend over". FIG. 2 of the referenced patent shows the blade height and width dimensions "x" and "y". The preferred blade height "x" ranges from 9 to 11 inches and the preferred width "y" ranges from 11 to 13 inches. FIG. 1 of the referenced patent shows the handle length "L" which preferably ranges from 30 to 84 inches. The "Flipper" is claimed to permit the User, by virtue of the long flexible handle, to shovel a light charge of snow while in a generally upright position and then by virtue of the flexible bending of the handle permit the User to "flip" the charge-perhaps not unlike flipping a pancake—to propel the snow to a desired location. The smaller than typical blade area is intended to help limit the weight of the charge, thus helping avoid over-straining of the operator's back when flipping the charge. Again, the action is a disjoint one of scooping up a light charge of snow then flipping it to a distant location.

Several drawbacks are evident with the "Snow Flipper" as follows:
FIRST—The "Flipper" must have a flexible blade and handle, as stated in the patent: "The combined resiliency of both the handle unit and the shovel blade unit is the heart of this particular invention". The Flipper's handle is required to be flexible to a specified function laid out in the "Diameter Schedule" of "Table 1" of the patent. This is a very stringent and tedious requirement.

If the diameter is larger than specified by the schedule, the result is a handle that is, to quote the patent, "too stiff" such that there would be no "flexing" nor "flipping" action to propel the snow or slush and, as the patent states, the flipper "would be in the same class as other constructions, too stiff". Conversely, handle diameters smaller than those specified by the diameter schedule would result in a handle that could bend to a too large degree or even fracture under the imposed load and could pose hand discomfort or pain to the User.

SECOND—The Flipper handle is made of a "continuous diameter wooden handle unit" to comply with the stringent flexibility requirement specified for it. This constraint limits the construction material of the handle compared to the many other materials that a handle could be made of. The patent states the Flipper's Table 1 "schedule will change depending on the type of wood" the handle is made of, again adding a level of complexity to the invention. Curiously the patent does not indicate what type or grade of wood the Table 1 schedule is based on, nor does it indicate or suggest how the Table schedule would change for different woods.

THIRD—Because of the relation of handle length to handle diameter as given in Table 1 of the Flipper patent, as the patent states: "different heights of users would require different lengths of handle units". Therefore, with the Flipper a multitude of different size units would need to be stocked to address the different heights of potential users and this requirement poses an unnecessary complexity in a seller's inventory.

FOURTH—The handle diameters given in the patent's Table 1 are relatively tiny ranging from 0.63 to 1.17 inches and the smaller diameters in this range could lead to user hand fatigue and pain.

FIFTH—The flipper's blade shape is akin to a dust pan, having a flat non-curved "blade bottom", "side wall elements" and an "angled rear wall element". The "angled rear wall element" acts as a fence at the back of the blade which would absolutely serve to hinder or stop any scooped charge traveling up and past the upper edge of the blade, as in a plowing action.

SIXTH—The Flipper implement does not lend itself to omni-directional movement of the snow, but is suited to flipping the snow in a more or less forward and, to some limited degree, sideways direction, but due to a relatively wide blade, not in a rearward direction, where, for one, the blade is more likely to interfere with the User's legs.

SEVENTH—The essential shovel nature of the "Flipper" still requires discontinuity of the motion for each shoveling cycle, since the steps of shoveling and flipping are discrete separate steps, and thus could contribute to more energy being expended versus if these two steps were combined into one continuous motion. Having to "flip" the snow at each cycle itself can impose a sudden jolt on the operator which can itself result in joint trauma.

Canadian patent application 2,417,854 to C. D. Carosi and A. F. Carosi, 2004 discloses a scythe-like "shovel, plow, rake, or broom device". CA2417854A1 claims to employ the [operator's] "upper body in side-to-side swinging and twisting motions, rather than the arms and back in push/pull and lifting motions to perform various types of work, resulting in less effort and less strain". This implement comprises a long handle fitted with an angled blade at the bottom end of the handle and also is fitted at the handle's midway point with a short laterally extending "mid-grip" set approximately at a right angle to the handle similar to that of the middle hand grip of a scythe. The handle is held "at an approximate forty five degree, or similar [angle] to the horizontal of the blade". The blade is offset by a corresponding angle "to a degree that keeps the digging part of the blade horizontal to the ground". CA2417854A1 also describes the device as resembling "an ice hockey stick and is held roughly in the same way. The device is held firmly in the hands and arms, and by a twisting of the upper body moves the device from side to side creating in [sic] a large arch with the business end of the device." While the scythe-like device is described as being useful for shoveling, plowing, broom sweeping and raking, the foregoing discussion is limited to comparing its shoveling and plowing aspects:

FIRST—Design: The scythe-like implement has the form of a traditional scythe as described above, except that various blades suited for plowing, sweeping, raking and shoveling can be fitted to the lower end of the handle in place of the sharp cutting blade of a traditional scythe used for mowing fields. No defined blade sizes are disclosed or discussed in the CA2417854A1 disclosure; its FIGS. 1 and 2 depict a curved plowing or shoveling blade of relatively low height and having a width considerably longer than the height, in other words it possesses a low, wide blade. The blade of the device is set at an angle to the handle and ground in a way similar to the angled blade of a hockey stick. This generally will force the User of the device to always hold the handle so the blade is positioned relatively far away from the User; thus, motions where the blade is close to the User will not be possible, useful, or at best will be awkward or inefficient to perform.

SECOND—Operation and Capabilities: The scythe-like implement is described as being held in the same way as a hockey stick and operated just as a traditional scythe with a side-to-side twisting motion of the upper body creating a "large arch" at the blade end. In terms of a shoveling or sweeping function, the scythe's blade is depicted in FIG. 1 as having an up-and-down curvature in one direction so as to move or sweep material to one side only (and not side-to-side as claimed). The scythe implement relies on a side-to-side twisting motion of the upper body, and such motion will necessarily involve the twisting of practically the entire spine of the User, including the lower back. Twisting of the torso is limited in the amount of torque or power that the User can apply to the handle and blade. Another example of a disadvantage and limitation of the scythe implement is its use as a snow shovel or hand-plow; imagine a narrow snow covered walkway or stairway, and especially with parapet walls on both sides needing to be cleared with the scythe implement. In this case, the scythe's large arching side-wise shoveling function would be seriously impaired both by the walls, the narrow steps, and the generally restricted space to be cleared.

U.S. Pat. No. 3,804,451 to T. P. Burke, 1974, discloses a "Snow Broom" which can be utilized either in a broom-like "sweeping action, or readily converted to a snow shovel" all for the purpose of snow removal. This implement employs straight interlocking metal tines as the "bristles", and which tines have a certain flexibility that can be adjusted by a sliding "restraining member". The longitudinal axes of the tines are arranged parallel to and in a plane with the axis of the handle and project away from the handle as in a typical broom. Thus, as in a typical broom, there is no angled offset between the longitudinal axis of tines and the handle axis as all lie more or less in a single plane. A number of disadvantages for the snow broom are evident as follows:

FIRST—In Sweeping mode: The snow broom's tines will tend to bend opposite to the direction of sweeping into snow so they may be inefficient or largely inoperative for the purpose of scooping a charge of snow upwards and away from the User to any appreciable degree; it appears impractical for imparting any significant elevation to the snow being moved, practically limited to just sweeping it to the side. If the fallen snow is of any significant depth, this would pose a serious drawback as the swept snow will likely tend to pile up and compact rapidly ahead of the broom head, tending to impede any further sweeping.

SECOND—The head or blade of the snow broom is shown in the patent's figures at least as being relatively wide and very much wider than its height and of relatively large size. This will hinder the User's ability to engage in a rearward sweeping or rowing motion because, if the blade is too wide, it will tend to interfere with the User's legs. In addition, the large size of the blade would likely require significant force and strength to sweep heavy or deep snow.

THIRD—In shoveling mode: While the snow broom patent claims the implement can be converted to a snow shovel, a number of drawbacks in this mode of operation become clear. As mentioned above, the axes of the tines are parallel to the axis of the handle so there is no angled offset or preformed forward curvature of the tines, as would usually be desired in a typical shovel in order to efficiently permit scooping up a charge of snow. For this same reason (i.e. that the implement as a shovel possesses a "blade" that is essentially flat and possessing a tendency to bend or curve backward under load, the User likely will have to stoop or bend down to a significant degree in order to permit the blade to scoop up any appreciable charge of snow. If a charge is lifted with the blade, again with an essentially flat blade and with the weight of the snow charge tending to cause the tines to bend backward and down, so that rather than cradling the snow charge, the blade would tend to form an unstable platform wherein the snow will tend to fall off the front or back edge, or even over the side edges of the "blade".

FOURTH: Ability to limit flexibility of the snow broom's tines: The patent discloses that a slidable box-like "restraining member" (16) surrounds the tines and can be positioned via an "actuating rod" (14) higher or lower relative to the tines with the aim to increase or decrease the flexibility of the tines. It is not clear how the restraining member can effectively limit the flexibility of the tines since the tines are already interlocking so that, as the patent claims, "the forces tending to bend any one or more tines are transferred to the other tines to produce bending in all". When the restraining member is positioned downwardly, it is supposed to prevent or greatly limit the bending of the roots of the tines (i.e. the tine portions between the restraining member and their attachment point to the "transverse bar" 11), yet it is not clear how effective this action will be. This is because the restraining member is slidable up and down over the tines, so when a large lateral force or weight is imposed on the tines, they will still want to bend, and the only member that can otherwise react this root bending is the "actuating rod" (14); it is of such slight cross section compared to all the tines that it will likely be relatively flexible itself and want to bend with the tines.

FIFTH: The Snow Broom comprises a considerable number of precision metal parts and would be more complex to manufacture than a typical snow shovel possessing fewer and simpler parts; hence, the Snow Broom would cost more to manufacture and have a higher market price than simpler designs.

US20120235432A1 (Application) by Francis C. McCartin, 2011, discloses an "Ergonomic Snow Removal Implement". This tool is essentially a cross between a flat-bladed spade and a snow broom. It relies on flexibility in the handle and blade assembly, formed by a fan-shaped set of flat tines, to impart momentum to a charge. Its operation is largely described as a shoveling action similar to the previously described "Snow Flipper". It does mention the idea of it also being able to "push loads along a surface" more like a "pusher" type shovel. It is designed so that the User can "maintain a relatively upright posture while using the implement". The one example disclosed for the blade width dimension is a width at the "base" of 42 cm (~16.5 inches). The "plough" member is therefore relatively wide and low in height and, with the added resistance posed by the tines, the blade assembly will present considerable resistance against a manual plowing action if the blade is driven face-on into snow. Especially in relativity deep snow the resistance would likely be exorbitantly large and the built-in flexibility of the blade assembly will tend to cause it to bend backward opposite the direction of motion. The blade assembly is not described as having any preformed forward curvature; therefore it's assumed to be initially more or less flat or planar in form. This, plus the blade's flexibility aspect will not be optimum for either a shoveling or plowing action as there will then be no means to efficiently cradle the charge-rather just the opposite, since the backward bending of the once flat blade will tend to allow a charge to slide and fall off the sides or bottom edge of the blade or plow member in any sort of lifting or plowing action. The broken non-smooth face of the blade assembly, formed as it is of crisscrossed tines, cross member, etc., will not easily nor efficiently permit a charge to slide up or down the blade face if at all and thus hinder certain manual plowing actions where blade face smoothness is desired. The reference teaches against employing a "fixed, rigid-type snow blade" and claims "the implement . . . efficiently exploits a designed resilience" but other than indicating the tines and handle are flexible, gives no engineering details to know the degree to which this is needed or useful. The blade is an assemblage of multiple components (tines, cross member, plough board, fasteners and clamps) meaning increased complexity and relatively high cost to manufacture.

U.S. Pat. No. 4,996,834 "A Cleaning Paddle" to George A. Geist (1991) is designed to "remove" snow or leaves by the user employing a rearward "paddling action rather than pulling [sic] or lifting-and-throwing action" conveying the notion that it is a pusher type tool that merely pushes a charge along the ground rather than a more rapid motion to impart momentum to send the charge to a location remote from the user. The reference does not give specific dimensions for the blade width nor height nor handle length nor diameter but does mentions the idea of employing the tool "while the user stands erect". It appears from the figures that the blade is intended to be relatively wide and, as a pusher, is intended to ride or scrape along the pavement. The construction includes means to mount the blade to the handle via a pivoting connection to allow the blade to remain parallel to the ground when the handle is angled out from the user's side and this feature adds complexity to the tool's structure and manufacture and also to its cost. A wide blade with a pivot feature would likely hinder its operation in moving deep snow. Also, the idea that the blade be pivotably mounted so it remains parallel to the ground gives the idea that the blade is sufficiently wide that it must be held at a distance from the user by angling out the handle away from the user's side in order to prevent the blade hitting the user's body in operation. The possibility of its use in moving snow in other directions besides rearward, such as sideways or forwards is not discussed. Finally, its design does not seem suited to its being employed in a traditional shoveling mode.

In summary previous art devices suffer from one or more of the following disadvantages:
  a. Device is a complex assembly of multiple components increasing cost to manufacture.
  b. Device is not optimized in terms of blade width, height and handle length for efficient "manual plowing" in various lateral directions relative to the User whether due to the large width and/or weight of the blade and/or the short length of the handle.
  c. Some devices depend on (usually unspecified) designed-in flexibility or resilience of blade and/or handle in order to provide the stated snow clearing and shoveling function.
  d. None of the devices can be efficiently employed in all of the following modes of operation: omni-directional manual plowing, pusher plowing, traditional shoveling.

SUMMARY OF INVENTION

In one embodiment, there is an implement having an elongated handle, to one end of which is attached a blade of relatively narrow width and slight arcuate curvature, the blade width being sufficiently narrow to permit a stationary or semi-stationary upright standing User by manipulating the handle to employ a more or less continuous oar-like rowing motion to drive the upright blade more or less face-on into fallen snow, slush, or ice and at high enough velocity to impart at least a momentum or velocity to a charge as in plowing. This action is intended to send the charge outward, upward, and away from the operator, and generally in the direction of the blade's motion, and more or less parallel to the ground and with also a component of upward initial ballistic trajectory, all which can direct the charge away from the User toward a desired and relatively distant resting location. The User may drive the blade more or less face-on through snow, slush or ice in any convenient direction, for example forward, sideways, or even backward, relative to the User and without the blade interfering significantly or at all with the body of the User. The handle is sufficiently long to permit an operator to engage in the snow clearing while remaining in a relatively upright standing stance while operating the implement. The disclosed implement is intended to be economical to manufacture.

Employing a more or less continuous motion as described greatly differs from the more typical disjoint and energy intensive bending-forward-scooping-vertical-lifting-turning/twisting-walking-and/or-dumping-or-flipping-or-tossing shoveling process required by previous art as represented by how a typical snow shovel, which has a relatively wide blade and relatively short handle, is employed.

The present inventor realized that a combination of a relatively narrow width blade and a relatively long handle might more closely match the strength of a User to the mechanical impedance—that is, the resistance—of the material to be moved by a snow shovel when employed in a manual face-on plowing action. To this end, one can imagine the area of the front face of a snow shovel's blade being reduced by greatly narrowing the width of the blade so that it presents less frontal area. One can imagine that the blade width can be made so narrow, say as narrow as the handle, that it might then be unusually easy to manually drive, draw, push, pull, sweep, or swing such a narrow blade face-on through snow, even relatively deep snow, and perhaps at a relatively high velocity and in a more or less continuous "manual plowing" action. This "manual plowing" action may thus impart a continuous upward and lateral ("lateral" in this case meaning in the direction of blade motion and outwardly and away from the operator) momentum to the charge of snow in front of the blade and thus propel the snow in a ballistic trajectory through the air toward a distant desired resting spot. Yet perhaps with a blade so narrow, only a very small quantity of snow may then be moved with each cycle making it a relatively inefficient method to move snow. Conversely, one can imagine the blade being made increasingly wider until the width of the blade is so wide as to require more strength than a User can manually furnish to drive, draw, push, pull, sweep, or swing the blade face-on through snow under this condition. This extreme case then, depending on the depth of the snow, and especially in relatively deep snow, might slow or even prevent the User driving the blade through and hence unduly slow or prevent any movement of snow. Again, efficiency in moving snow under this extreme condition would likely suffer. Now it can be imagined that somewhere between the two extremes, that is, between a very narrow width blade versus a very wide width blade, is a blade width, or range of blade widths, where the User's strength more closely matches the mechanical impedance (that is, the resistance) of the amount of snow to be moved with each pass. Under these conditions, even a person of normal strength might continue to move a blade of such width through snow with sufficient velocity to impart momentum to the charge so as to propel the charge through the air away from the User and toward a relatively distance resting spot and at the same time move a sufficient amount of snow with each pass or cycle so that this method of moving snow becomes a practical endeavor.

In one embodiment, the handle can be made relatively long to permit a better (and perhaps more ergonomic) purchase or leverage by the operator (for example by permitting a wider grip for better control, and for longer reach) and to permit the User to manipulate the implement's blade into snow while the User remains in a more or less upright standing stance, even if the implement is being held so that the handle is angled out, down, and away from the User. Moreover, the longer the handle, the more easily the User may employ it to impart more velocity to the blade and thus propel a charge of snow with such a plowing motion from a stationary or semi-stationary and upright standing stance, and be able to propel the snow in a desired direction toward a relatively distant resting spot. Neither the handle nor the blade of the implement need flexibility in order to operate as described. Even if the handle and/or blade were perfectly stiff, possessing no flexibility at all, this should not hinder the ability of a User to manually drive the blade face-on through snow. And even if either the blade or handle or both possess some flexibility, this should also not hinder the functioning of the implement.

There is a range of both blade widths and handle lengths, any suitable combination of which together will make it practical to employ this "manual plowing" method of snow removal. In scientific terms under these conditions, one could say that the mechanical impedance between the driving (manual) force and the driven (snow's) resistance are more closely matched when compared to the extreme cases presented earlier. It is also a principal of science and mechanics that, in general terms, the more closely matched the impedance between a driving force and a driven resistance, the more efficient the operation; that is, more energy or work input will be manifested in actually moving material as opposed to being wasted by draining the reserves of the User with little result (i.e. less moved material) to show for a given expended effort.

The implement can also be employed in a modified pusher, or "pusher plowing" mode. That is, due to the long handle, the User can hold the handle so the blade is tilted back and oriented at a more shallow angle to the ground, the long handle permitting the User to do this while still remaining in a more or less upright stance. The long handle also permits a User to keep the blade a useful and safe distance in front of the User so it does not interfere with the User's body when the handle is pulled back. The User can then apply a relatively rapid linear forward motion, using both hands, to the blade, or can also employ a relatively large linear or arcing arm motion to in either case push or urge the tilted-back blade forward along a pavement or other surface into fallen snow, slush, or ice causing the charge to ride into and up the front face of the blade and, depending on the speed of the blade along the ground and depth and density of the fallen snow, be ejected upward and forward of the blade toward a distant resting spot. The User can also elect to engage in the motion more slowly as well, so that the charge is merely carried or pushed along by the blade, and again due to the long handle, even in this mode a relatively long path can be cleared with each cycle while the User remains stationary or semi-stationary, thus avoiding having to walk the blade along as much as is traditionally required with pusher implements.

The snow moving operations described above might be described as "manual plowing", with the impetus for the blade movement being manual in nature rather than being due to a mechanized or motorized plow which is attached to the front of a vehicle and whose powered wheels push the usually curved plow blade face-on into the snow.

Further the implement offers flexibility in still permitting it to be employed in a traditional shoveling mode as described earlier. The relatively long handle of the disclosed implement can offer advantage here by permitting this action to take place while the operator is in a more upright stance as opposed to having to bend down and forward, as is typically the case with a short handled snow shovel and which action can dispose the operator to back strain or injury in addition to increasing the energy expended. By virtue of the long hand and narrow blade, the Implement can permit a User to even clear snow, slush, and ice, while proceeding downwardly along downward-going steps or walks, from the "porch to the curb" so to speak, while remaining relatively upright.

A more traditional short-handled, wide-bladed snow shovel has a blade that is wide and tall, and typically wider than it is tall, and thus, as mentioned, presents a great surface area against the snow to be moved if employed in a face-on plowing action, so much so as to likely require enormous and perhaps prohibitively super-human strength to operate in such a manner, especially in deep or dense snow. In addition, even if sufficient manual strength could be mustered, it is likely the handle would either unduly bend, or break, or need to be increased in size to strengthen it in order to avoid these effects and this would make the implement heavier and more expensive to manufacture and more prone to sap the operator's energy more quickly.

Advantages

Accordingly, embodiments of the present invention can provide one or more advantages as follows:

The implement can permit a User to engage in a rearward, sideward, or forward manual plowing action and in so doing impart a generally lateral and upward initial trajectory to a charge to send it away from the operator toward a relatively close or distant desired resting spot.

The implement can permit a User to engage in the manual plowing action while the operator can remain in a more or less upright and stationary or semi-stationary standing stance.

The implement can permit the above described snow clearing operations with attendant advantages when clearing or moving snow of various depths ranging from shallow to relatively deep snow.

The implement can permit the above described snow clearing operations in broad open spaces, narrow spaces, narrow walks, narrow or wide steps with or without parapet walls, side walls, guard rails, or other similar barriers.

The implement can be employed in a modified pusher mode and the User can perform this snow clearing operation with less or no need to walk behind the implement.

The implement furnishes the above stated advantages and yet can still permit employing it in a traditional shoveling mode if desired.

The implement furnishes a slightly curved blade, as opposed to a flat-bottomed scoop-like blade with bluntly oriented rear fence or ridge, so the User can now engage in the manual plowing action as above described.

The implement can permit an operator to send snow rearward, forward, or to one side or the other by employing an oar-like rowing or broom sweeping-like action that avoids the operator having to bend down and avoids having to vertically lift a charge to the extent that is typical when performing snow clearing with a traditional shovel and shoveling technique.

The implement can help to conserve a User's energy when manually moving snow by the User avoiding the extensive bending down and vertical lifting actions of traditional shoveling and by perhaps avoiding the User having to walk a charge to dump it in another location. Avoiding extensive bending down and avoiding having to lift a charge appreciably, if at all, has the additional virtue of reducing the risk that an operator develops back strain or other related back injuries.

The implement permits a User to manually plow, fling, or throw snow to locations remote from the User, in virtually any direction, without the need for the handle to be made flexible to any specified function and without the need to furnish a tedious and complicated "Diameter Schedule" or set of schedules each linked to a specific grade of wood. This then also can permit fewer or just one handle size to be suitable for persons of various heights so that there is then little or no need for a manufacturer to make handles of various diameters and lengths, and little or no need for a distributor to have to stock an inventory of implements having an undue number of handles with different diameters and lengths to suit persons of different heights.

The implement can employ more options for selection of its handle material and handle design. This is because the handle can be either rigid or flexible without hindering its function. The handle can be made of a material or combination of materials other than just one type of wood. In addition, the handle's cross section is not limited to circular but also can have other shapes or combinations of shapes that may lend themselves to more efficient manufacture and/or use. In addition, this can allow for a broader range of handle girths and geometries that can be more suitability comfortable and ergonomic.

Embodiments of the implement furnish a means to afford a relatively smooth, continuous "manual plowing" action with the intention to cause less impact, jolting and disjointed movements typical shoveling actions require and which further is intended to reduce the risk developing joint or other impact related bodily injuries.

By virtue of the long handle and narrow blade, the Implement can permit a User to clear snow, slush, and ice, while proceeding downwardly along downward-going steps or walks, from the "porch to the curb" so to speak, while remaining relatively upright.

Embodiments of the implement are intended to be economical to manufacture.

BRIEF DESCRIPTION OF THE DRAWINGS

FIGS. 4A and 4B are sectional views taken from FIG. 2A. FIG. 4C is another embodiment where a handle receiving socket is shown disposed toward the back surface of a blade portion.

FIG. 7A depicts a cut-away view of a blade portion embodiment where a forward bend between the front face of the blade and the front face of a deflector flange is relatively abrupt. FIGS. 7B to 7C illustrate an alternate embodiment's cross section in which an arcuate fillet portion forms a gradual forward bend, by means of a fillet transition, between the arcuately curved front face of a blade and the front face of a deflector flange portion of a blade.

DETAILED DESCRIPTION

Figure 1:
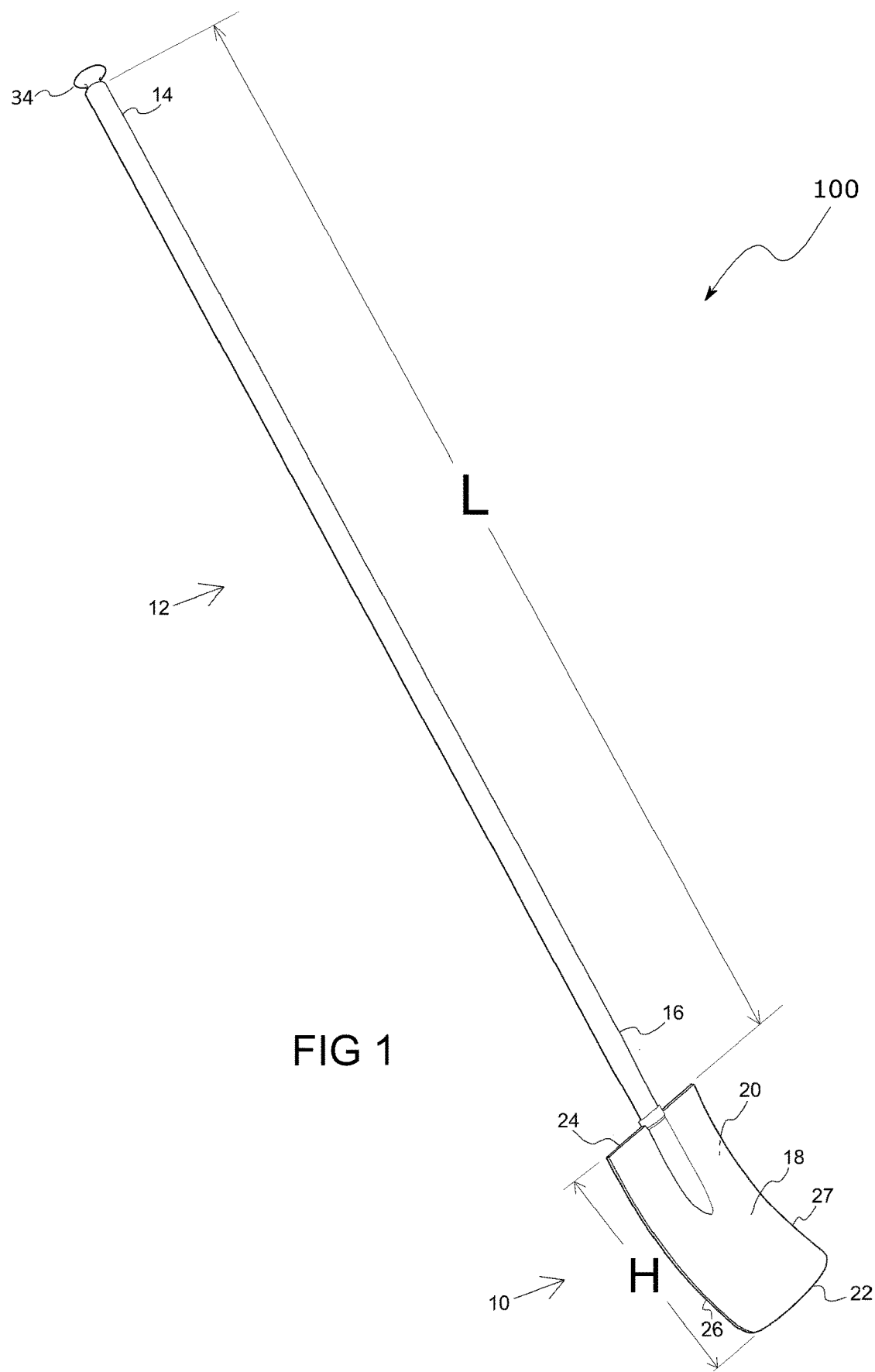
FIG. 1 shows one embodiment of a snow oar.

In the drawings, there are exemplary illustrations of features with the indicated reference numbers:
blade
12 handle
14 upper end portion
16 lower end portion
18 front face (of blade)
20 back face (of blade)
22 leading edge
24 trailing edge
26 first side edge
27 second side edge
28 handle attachment means
30 handle receiving socket
32 securing means
34 knob
36 deflector flange
37 front face portion (of deflector flange)
38 fillet portion (of deflector flange portion)
40 forward bend
44 rib
46 corrugation
50 side wall
51 joining means
52 inboard face (of a side wall)
53 arcuate fillet portion (of a side wall)
54 outward bend
100 snow oar implement
200 User
300 charge of snow, slush, or ice Referring to FIG. 1 and FIGS. 2A-2C, snow oar 100 comprises a blade portion, or blade 10, and an elongated handle portion or handle 12 having an upper end portion 14 and a lower end portion 16. The blade portion comprises a forward, or front face or surface 18, and rearward, or back face or surface 20 which are bounded by a lower, or leading edge 22 and by an upper, or trailing edge 24. A blade height, or longitudinal, direction is generally defined as running upwardly and downwardly between the upper edge and lower edge. A blade width direction runs generally transverse to the blade height direction and generally parallel to the front face of the blade. In the Width direction the blade is bounded by a first side edge 26 and a second side edge, 27.

The blade is shallowly arcuately curved in the height direction between upper edge and lower edge so that the front face is generally concave, that is, in the blade height direction the front face of the blade forms upwardly and downwardly a generally concave profile.

Figure 2A:
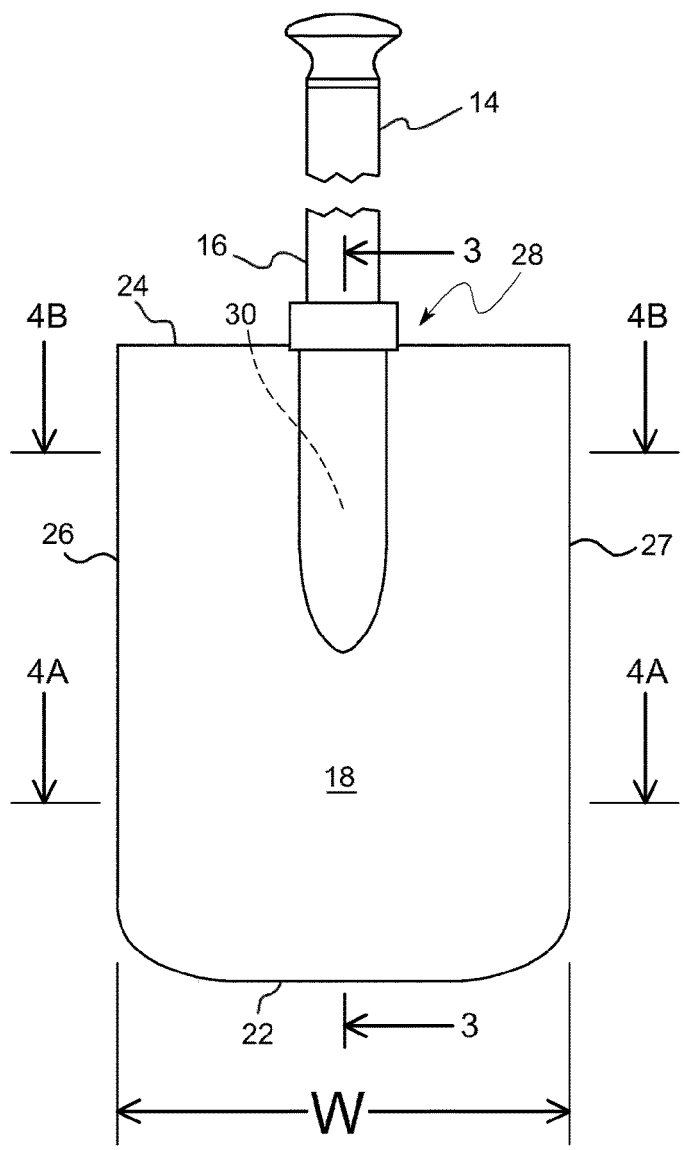
FIGS. 2A to 2B show front and side view in orthographic projection of the snow oar embodiment of FIG. 1.
Figure 2B:
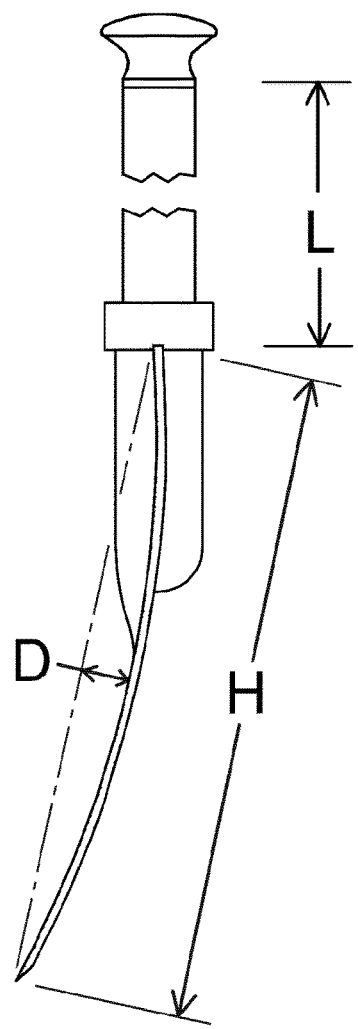

Referring to FIGS. 2A-2B, the blade portion comprises a handle attachment means 28 to fixedly secure or detachably secure the lower end portion of the handle portion centrally to the blade near, that is, at and in the neighborhood of the trailing edge which handle portion then extends generally upwardly and away from the blade and the trailing edge in a direction approximately parallel to the blade height direction. In one embodiment, the handle portion defines a handle length direction approximately parallel to the direction of elongation of the handle and parallel with this handle length direction is defined a handle length measure, or handle length, designated by "L" taken along the handle portion starting from, or relatively near, and relatively central to, the upper edge of the blade portion and extending to the furthest upward extent of the handle portion away from the blade portion, that is, extending to the furthest extent of the handle's upper end portion away from the blade portion.

Figure 3:
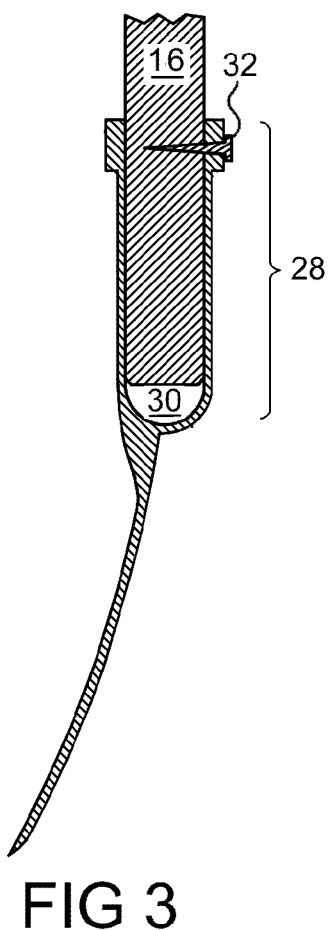
FIG. 3 shows a sectional view taken from FIG. 2A of the snow oar embodiment. A section of a blade portion and a lower end portion of a handle portion are shown.

Referring to FIG. 3 which is a section taken from FIG. 2A, in at least one embodiment, the handle attachment means 28 comprises a handle receiving socket 30, or socket portion which can be integral with the blade; for example, it can be molded as an integral part of the blade and centrally positioned at and in the neighborhood of the trailing edge so that said socket opens upwardly away from the blade and which receives by insertion the lower end portion of the handle and which handle is secured or detachably secured, to the socket by securing means 32 such as a screw, pin, or nail. In other embodiments (not shown), the securing means can comprise stapling, threading, riveting, crimping, gluing, welding, tack-welding, ratchet locking, detenting, detenting with a spring-loaded pin, press fitting, employing friction.

In another embodiment (not illustrated) the handle attachment means can be means to detachably secure the handle to the blade. For example, the handle can be fitted with a spring tensioned pin mechanism, or a push-pin, which engages a mating hole in a blade's socket so the handle can be slipped into the socket until the pin can insert into the hole to lock the blade in place. This then could permit easy and quick replacement of the blade, or handle, as well as allow various sized and shaped blades to be employed to suit particular conditions. For example, if the User wished to clear a relatively light layer of fallen snow from an area by employing the pusher plowing mode described earlier, the implement could be fitted for that task with a relatively wide "pusher" type blade having a bluntly oriented front face so that larger swathes could be cleared in each pass, and thus perhaps shorten the time needed to complete the work.

In at least one embodiment the blade is of a substantially rectangular shape when viewed in a direction generally perpendicular to front or back blade faces. Referring to FIGS. 2A and 2B, the blade defines an overall maximum blade height, or blade height, designated by H which is the maximum extent of the blade height in the blade height direction between upper edge and lower edge, and an overall maximum blade width, or blade width, designated by W, which is the maximum extent of the blade width in the blade width direction between the side edges. A blade depth of curvature designated by D is the maximum depth of curvature of the front surface measured in a plane generally normal/transverse to the blade width direction and in a direction approximately normal/transverse to the blade height direction.

Figure 4A:
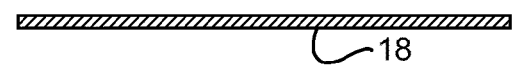
FIGS. 4A to 4C show cross sections of a blade portion.
Figure 4B:
Figure 4C:
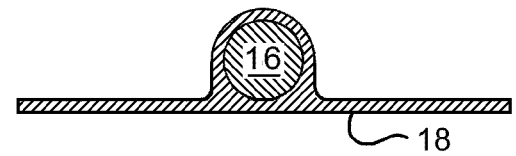

Referring to FIG. 4A, which is a section taken from FIG. 2A, in at least one embodiment, the profile of the front surface of the blade can be substantially straight or slightly concavely or convexly curved when viewed in this cross sectional view taken transverse to the height direction of the blade and parallel to the front face. Referring to FIG. 4B which is a section taken from FIG. 2A, in the case where the blade comprises a handle receiving socket 30, the front surface of the blade in the upper central portion may comprise a generally convex-shaped bump or bulge of the front surface shape resulting from the protrusion of a socket. In another embodiment, the socket may be offset rearwardly as shown in FIG. 4C so that little or no bump or bulge occurs in the front surface of the blade.

Figure 5A:
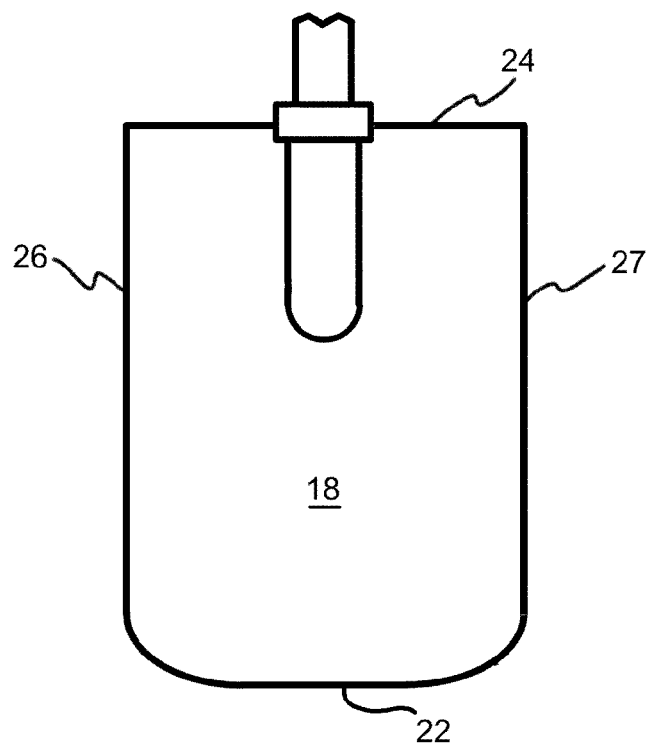
FIGS. 5A to 5D show various embodiments of a lower edge of a blade portion each viewed looking toward the Front Face of the blade.
Figure 5B:
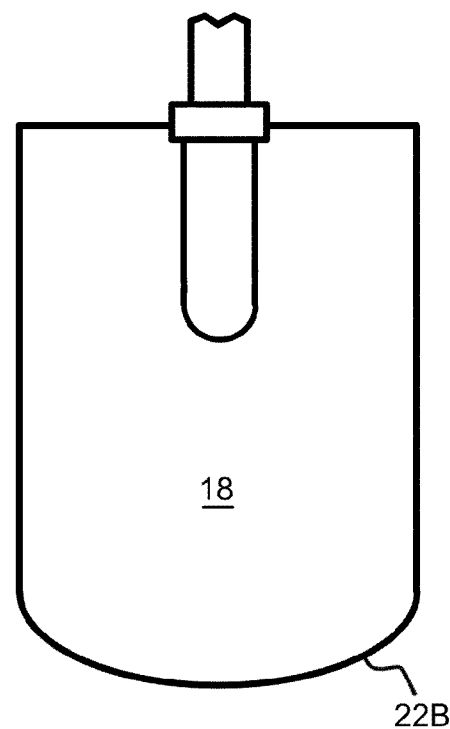
Figure 5C:
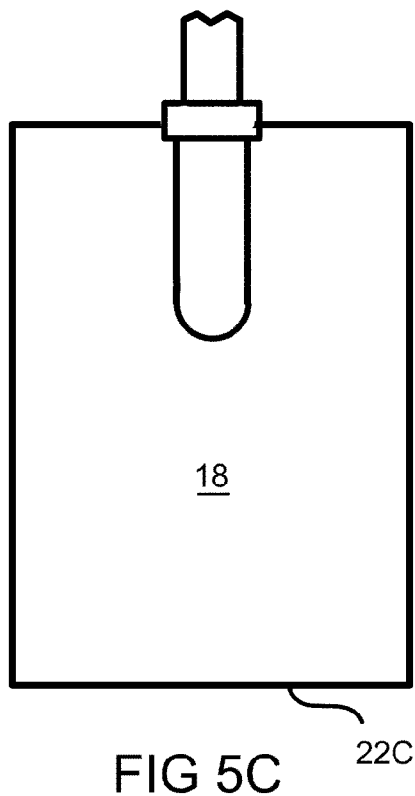
Figure 5D:
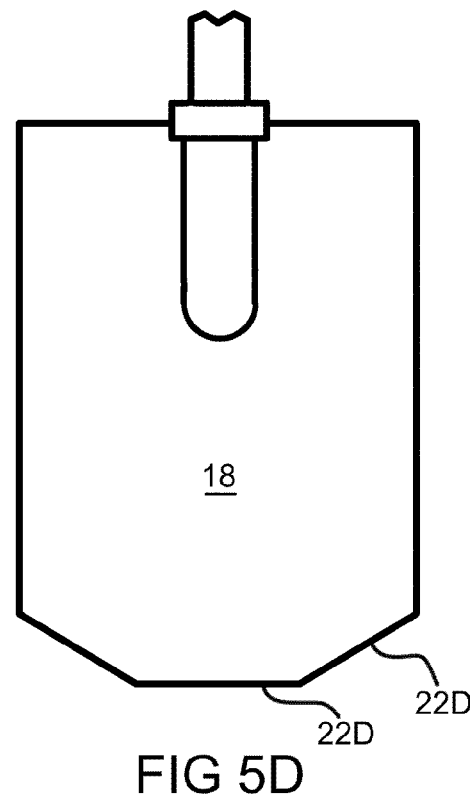

The leading edge 22 of the blade portion when viewed looking toward the Front Face of the blade can form or define a generally straight lower boundary or edge for the blade, said boundary being aligned generally in the width direction as in FIG. 5A, or the leading edge can form or define a downwardly convex arcuate or rounded lower boundary or edge 22B of the blade as in FIG. 5B. Further, the leading or lower edge can define a lower boundary for the blade that is more or less straight in the central or middle portion of the leading edge and that has rounded or arcuately defined corner portions, such as a rounded corner edge 22C as shown in FIG. 5C. Another embodiment provides a chamfered-corner edge 22D as shown in FIG. 5D, having corner chamfers defined between the straight middle portion and the side edges. The foregoing embodiments described for the lower or leading edge are listed here as some examples of embodiments contemplated, yet it should not be construed to mean that the leading edge should be limited to the embodiments described since the leading edge can define other shapes than those herein described. For example, suitable combinations of the foregoing descriptions can be employed, such as an asymmetric leading edge where one corner is chamfered and the other is arcuate in shape or is a squared off corner (not illustrated). Yet other leading edge shapes can be defined (not illustrated) than those described above.

Deflector Flange

Figure 6:
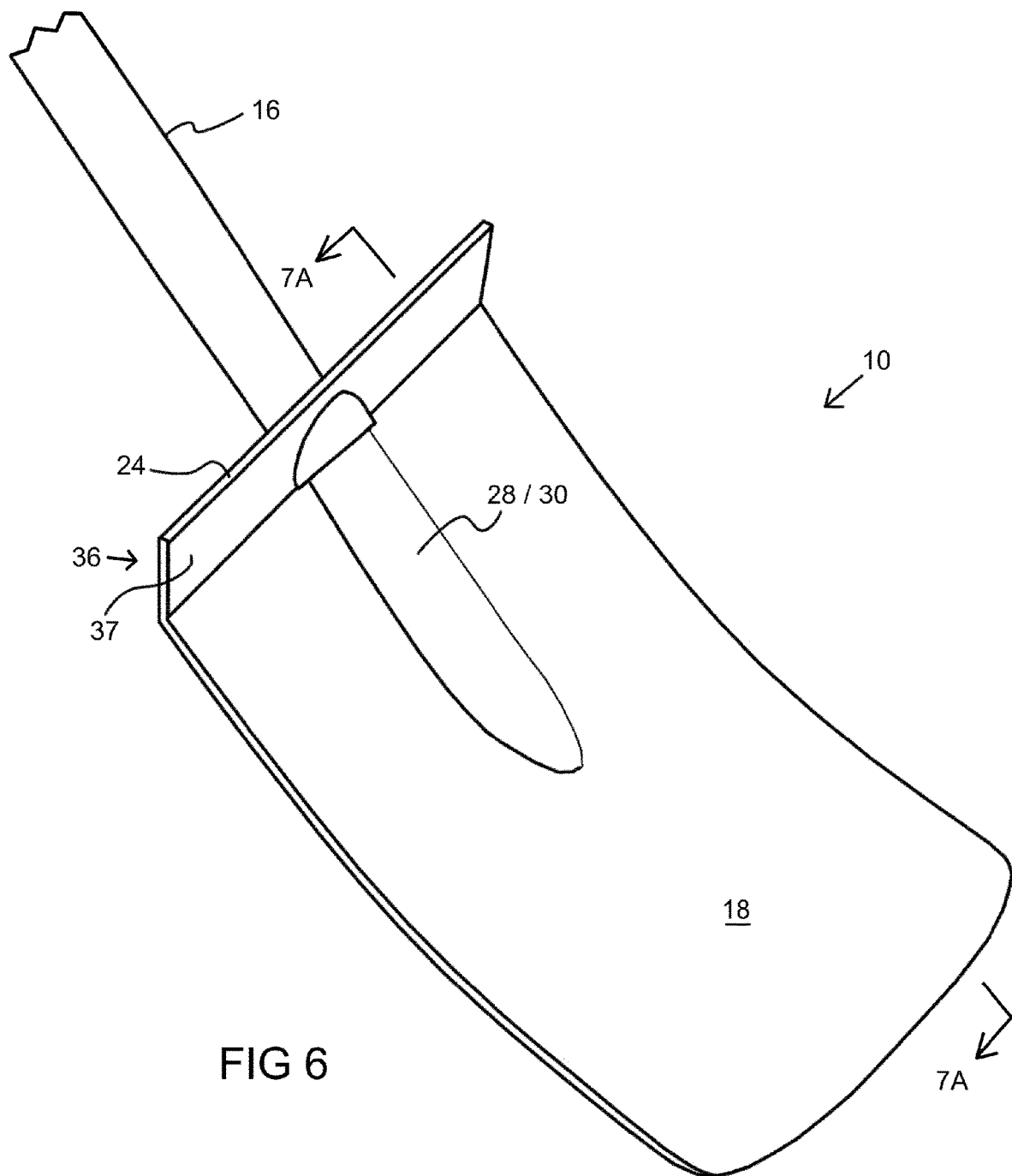
FIG. 6 shows a view of a blade embodiment in which the blade possesses a deflector flange.

In another embodiment, FIG. 6, the blade portion at and in the neighborhood of the trailing edge 24 may form at least one deflector flange portion, or deflector flange 36 further comprising a front face portion 37 which is the front face 18 of the blade at and in the neighborhood of trailing edge 24 and wherein the front face portion 37 of the deflector flange portion 36 of the blade portion is angled forward relative to the below adjoining arcuately curved front face portion of the blade portion and extends upwardly and forwardly therefrom. An obtusely angled forward bend 40 of angle θ in FIG. 7A, which is a cut-away taken from FIG. 6, is the angle between the below adjoining arcuately curved front face portion of the blade portion and corresponding front face portion of a deflector flange portion of the blade when viewed in any cross sectional plane taken approximately normal to the blade width direction.

Figure 7A:
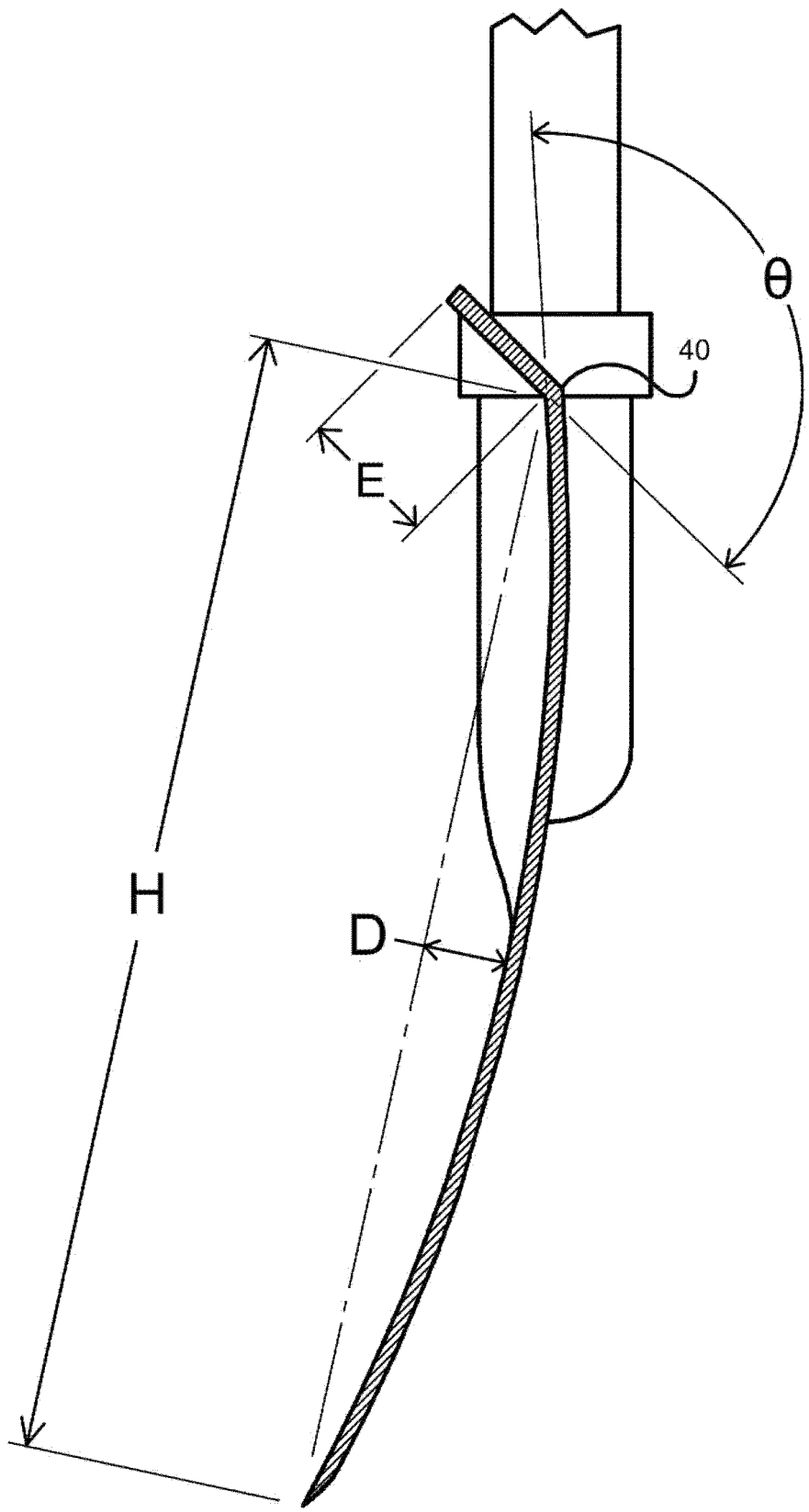
FIGS. 7A to 7C show side-perspective cut-away and sectional views with reference to cut-line 7A shown in FIG. 6, of embodiments of a blade portion. Various dimensional parameters of a blade are depicted in these figures.

Thus, in this embodiment the forward bend can be relatively abrupt, forming a corner as depicted in FIG. 7A, when viewed in any cross sectional plane taken approximately normal to the blade width direction, while the remainder of the front face portion of the blade portion adjoining and below the front face portion 37 of the deflector flange portion can be shallowly arcuately curved as previously described. In this case, the blade height H can be more accurately defined as the maximum extent of the blade in the blade height direction between lower edge and deflector flange portion so, in the case of the forward bend being an abrupt corner, the height would be measured from the lower edge to the corner as in FIG. 7A.

Figure 7B:
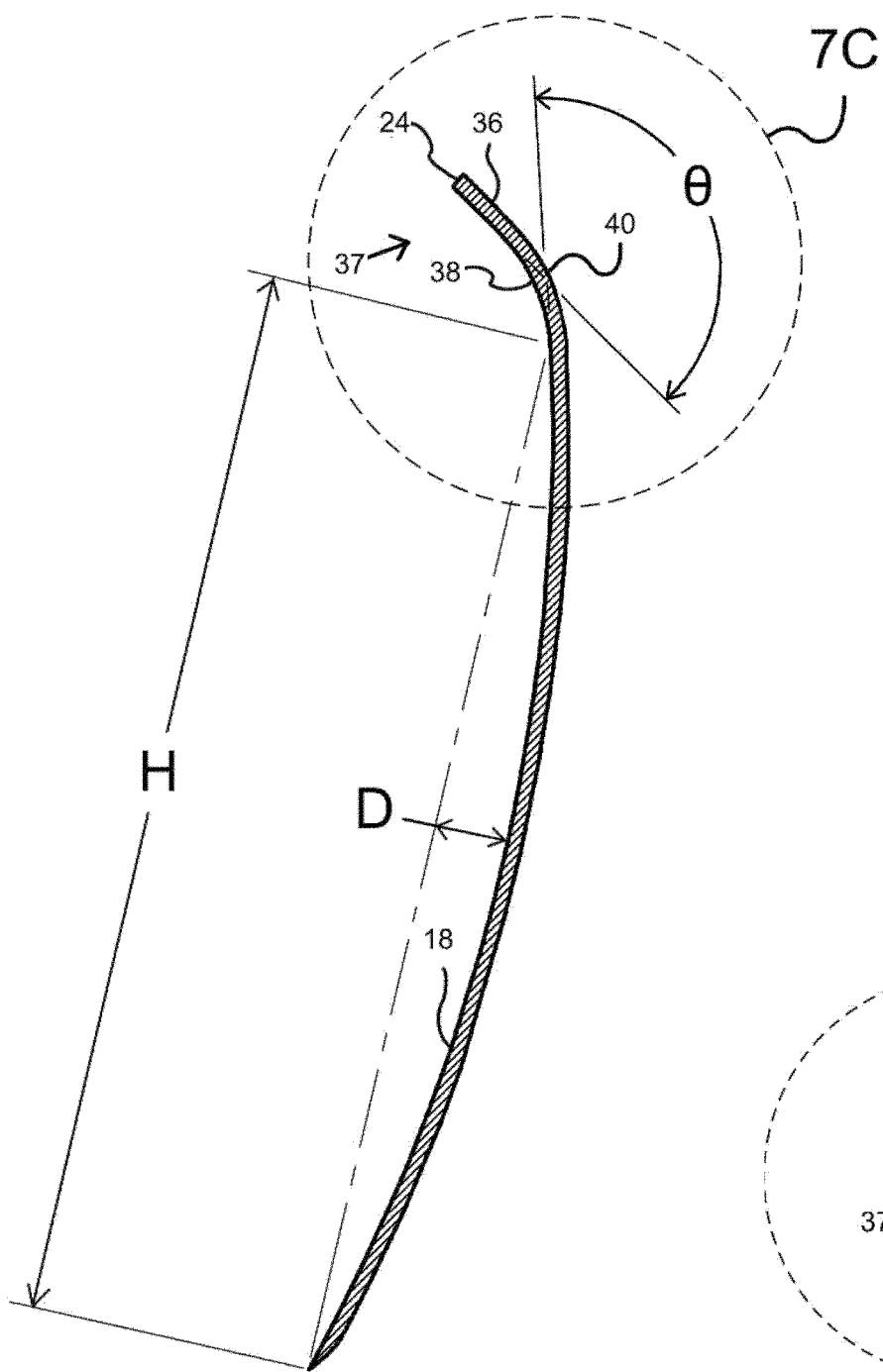

In another embodiment exemplified in FIG. 7B a sectional view using a like cut-line as used in FIG. 7A, the deflector flange's front face portion 37 further comprises a fillet portion 38 wherein the fillet portion 38 forms upwardly and downwardly an arcuate concave fillet profile. The forward bend 40 can then be the result of a gradual bending of the front face of the blade comprising the fillet portion of the deflector flange which gradually bends the front face of the blade forwardly as depicted in FIG. 7B. An obtusely angled forward bend 40 of angle θ in FIG. 7B is the angle between the below adjoining arcuately curved front face portion of the blade portion and corresponding front face portion of a deflector flange portion of the blade when viewed in any cross sectional plane taken approximately normal to the blade width direction. In the case of a gradual forward bend due to a fillet transition, the blade height H can be measured from the lower edge of the blade to the fillet portion of a deflector flange as in FIG. 7B.

Figure 7C:
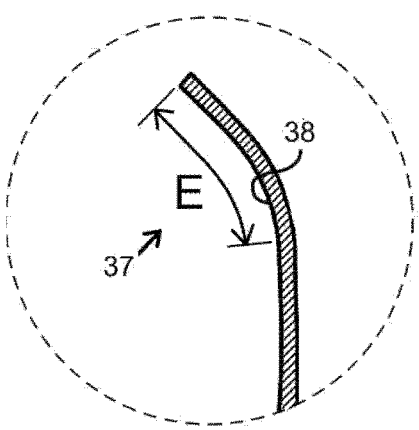

A deflector flange maximum length E in any cross sectional plane or station oriented approximately normal to said blade width direction can be defined in that cross sectional plane as the maximum surface length running upwardly and downwardly in that plane along the front face of the deflector flange portion of said blade portion as depicted in FIGS. 7A and 7C, respectively.

In one embodiment, a deflector flange can be formed as an integral continuous extension of the blade portion; for example, the blade portion and a deflector flange portion, if both are made of a plastic, can be molded as one integral component. In another embodiment, the blade and one or more deflector flange portions, if made of a metal, can be formed out of a single metal sheet.

A deflector flange feature can enhance the upward and forward motion of a charge. For example, when employing a manual plowing, including a modified pusher snow clearing operation as previously described, a deflector flange can aid in deflecting or urging the charge in a more upward and forward direction and speed which can send the charge further away, despite the blade's front face being oriented more or less face-on or tilted backward relative to the direction of motion of the blade.

Various Further Embodiments Described

In other embodiments, handle portion 12 and blade portion 10 can each be formed of one or more parts made of plastic, or of a composite such as graphite epoxy or fiberglass, or of wood, or of laminated wood, or of a metal such as aluminum or steel, or also can be formed of suitable combinations of any of these materials and constructions. In another embodiment, the handle can be made of tubing made of aluminum or plastic or steel or of combinations of two or more of these materials. Other materials and constructions beyond those mentioned here can be employed as well.

In various embodiments, the handle can possess a substantially straight elongated rod shape. In some embodiments, the handle can possess a substantially straight elongated rod shape with cross sections, taken transverse to the direction of elongation, that are generally circular. In some embodiments, the handle is an elongated rod shape of generally uniform diameter.

In some embodiments, the blade portion can be comprised of a plastic selected from the group consisting of an ethylene plastic, a blend that includes an ethylene plastic, polyethylene, polypropylene, polyvinyl chloride, polycarbonate, a blend of at least two of these plastics, and the handle portion can be comprised of wood or tubular steel. In some embodiments, the blade portion and the handle portion can be one integral part comprised of a molded plastic (as in for example see U.S. Pat. No. 4,280,727 to Germain, 1981) or of a composite such as graphite epoxy.

Various Further Embodiments Described

With reference to FIGS. 8A through 11, for blades constructed of molded plastic, or of a composite such as graphite epoxy, there are known methods that can be used to reinforce and stiffen the blade, if needed, against unduly large flexure and stress, as for example by means of employing integrally molded or discrete stiffening ribs, or keels 44, corrugations 46, or combinations of these, as an integral part of the blade. Also, in the case of composites such as graphite epoxy, judicious arrangements of the orientations of fibers can be employed to selectively stiffen and strengthen the blade.

Corrugations

Figure 8A:
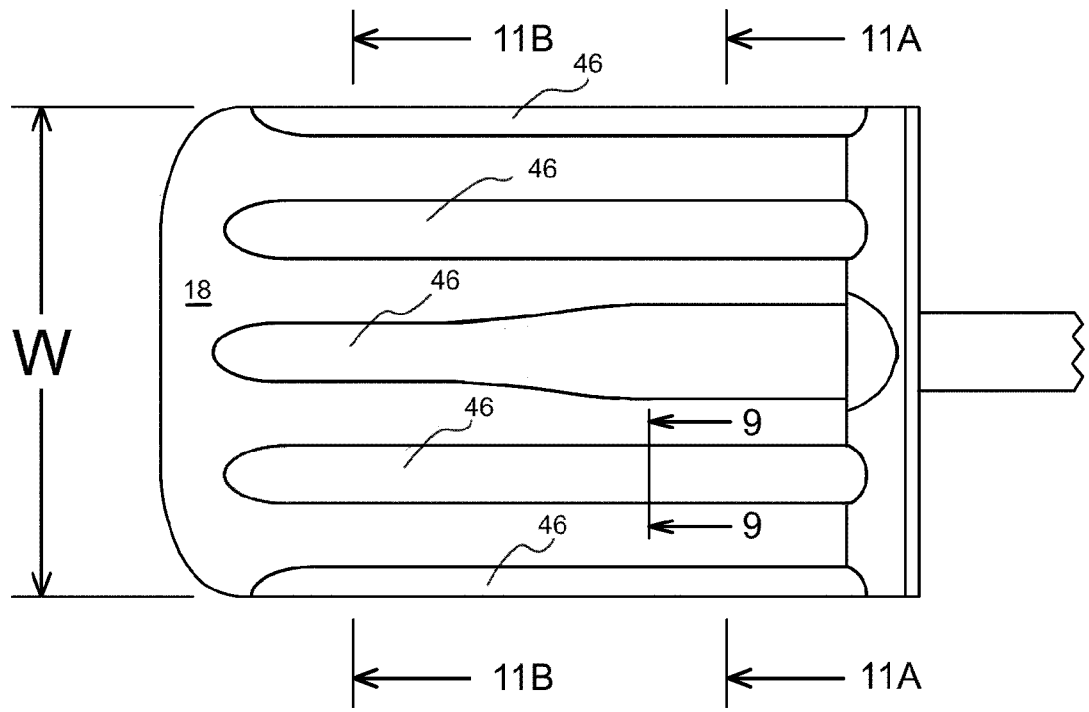
FIGS. 8A to 8B show front and side views in orthographic projection of one blade embodiment where the blade comprises corrugations and ribs.

In some embodiments of a blade there can be one or more corrugations 46 formed in the blade 10 which can act to stiffen the blade against undue bending or flexure in a plane more or less normal to the blade's width direction, and can also function as guides for a charge by preventing or discouraging a charge from sliding sideways across the front face of the blade toward or off a side edge of the blade. Referring to FIG. 8A (which is a view looking toward the front face of the blade) and 8B (which is a side view of the blade looking in a direction parallel to the blade width direction), a corrugation 46 is generally a forward jog, or forward protrusion or bulging, of the blade material, and which corrugation is elongated generally in the blade height direction, although in some embodiments (not shown), all or some portion of a corrugation may elongate in other directions.

Figure 9:
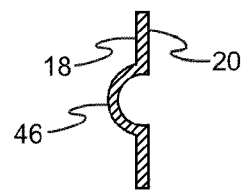
FIG. 9 is a local cross section of the blade taken from FIG. 8A showing a cross section of a corrugation while omitting the rib detail.

Thus, referring to FIG. 9, which is a local sectional view taken from FIG. 8A, a local cross section of the blade taken generally at a corrugation and transverse to the direction of the corrugation's elongation, that is to the blade height direction H, shows that at each corrugation the blade cross section can form on the front face of the blade a convex forward projecting jog, bump, bulge, or protrusion of the front surface of the blade, typically of a shallow U-shape or profile, and the rearward or back surface can form a corresponding though concave forward projecting depression or hollow of the rear surface of the blade. Note that the corrugation's shallow "U" shaped cross section as depicted in FIG. 9 does not have to be an actual U-shape. Rather any shape that increases the blade's flexural stiffness can be employed, so that for example, a rectangular or box shaped, or triangular shaped, and many other shaped jogs could also be employed.

Figure 10:
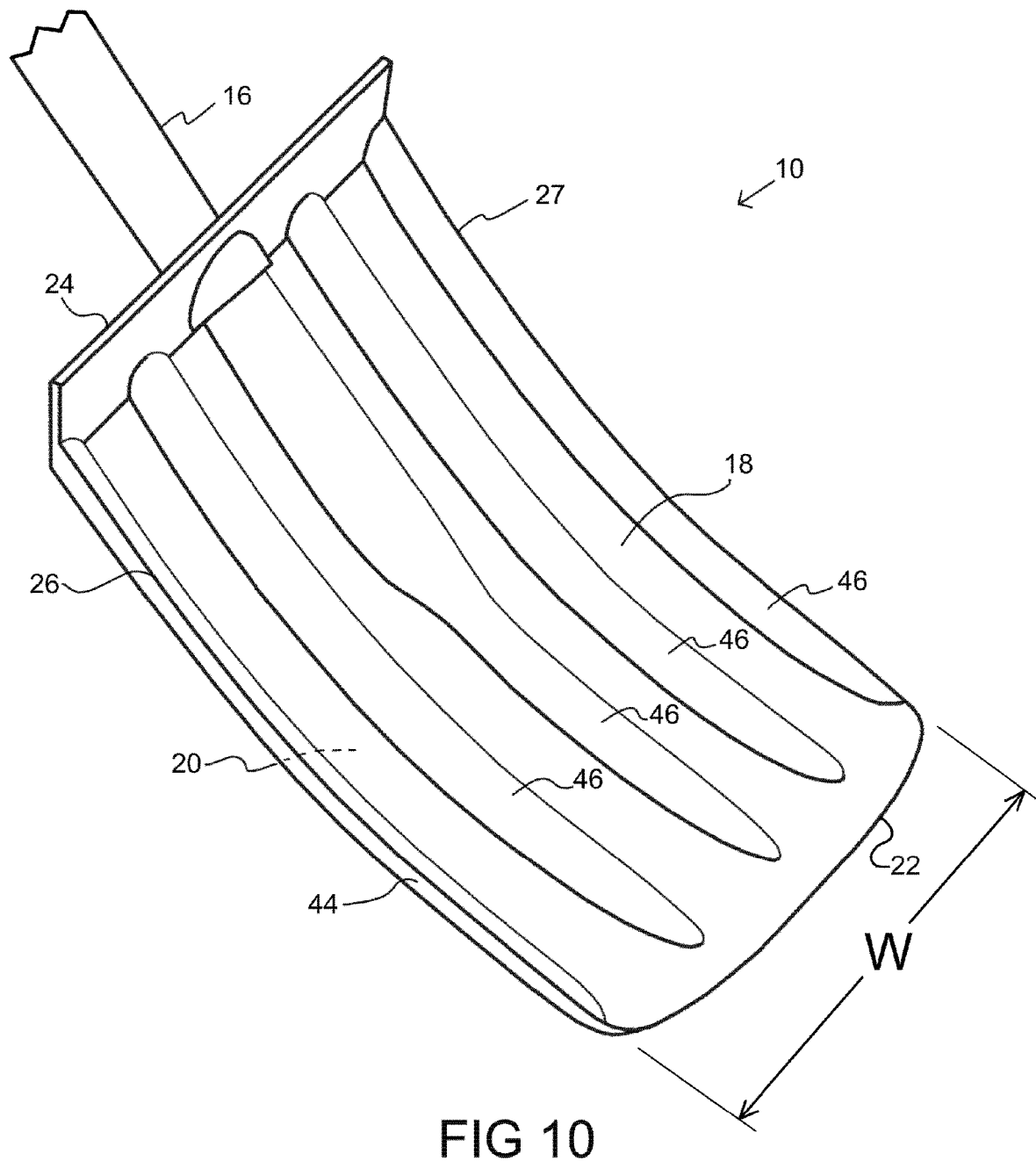
FIG. 10 shows another view of the blade embodiment of FIGS. 8A and 8B.

Referring to FIG. 10, in some blade constructions a plurality of corrugations 46, integrally formed in the blade, are spaced in the blade's width direction W and each corrugation 46 extends substantially between the leading edge and trailing edge. Corrugations 46 typically may taper down in cross sectional size until they vanish near the leading edge of the blade and may also taper down in cross sectional size as they approach or near the trailing edge of a blade, or they can extend without tapering in size to the trailing edge or they can intersect with and terminate at a deflector flange, at any rate a corrugation can extend upwardly approximately in the blade's height-wise direction to at least approach the neighborhood of the trailing edge.

In the case of a blade constructed of a metal sheet, corrugations may also be employed as blade stiffeners and guides and may be formed by being stamped or embossed into the metal sheet forming the blade.

Ribs

Figure 11A:
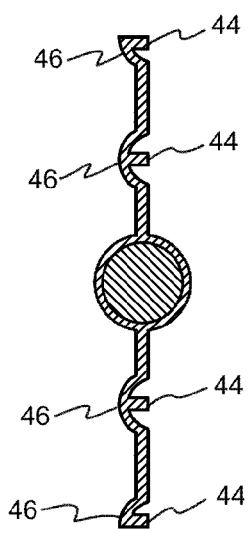
FIGS. 11A to 11B are sectional views taken from FIG. 8A showing corrugations combined with ribs.
Figure 11B:
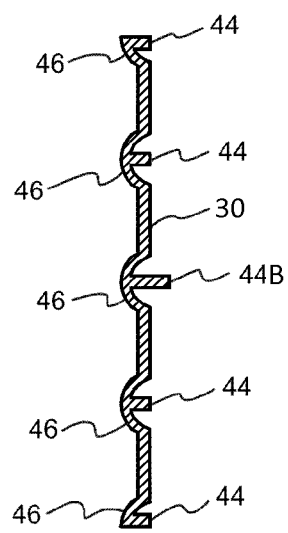

Refer to FIGS. 11A and 11B, which are sectional views from FIG. 8A, but which now also show the rib embodiments, mentioned previously, which are to be described in more detail here. A rib or keel portion, or rib 44, of a blade portion is typically a longitudinally oriented fin-like emanation elongated generally in the blade's height direction and that projects away from and generally perpendicular to the front or back face of the blade and whose main purpose is to stiffen, or reinforce, the blade against undue deformation and stress. A rib can also function as a wear surface where a rib or keel can contact the pavement or ground. Rearward projecting ribs and keels are the most common. A rib or keel can also be oriented so its direction of elongation is at an angle to the blade's height direction for some or all its length.

Forward projecting ribs and corrugations may provide for blade stiffening and can also function as guides for a shoveled charge by helping to prevent a charge from sliding sideways across the front face of the blade toward or off a side edge of the blade.

Figure 8B:
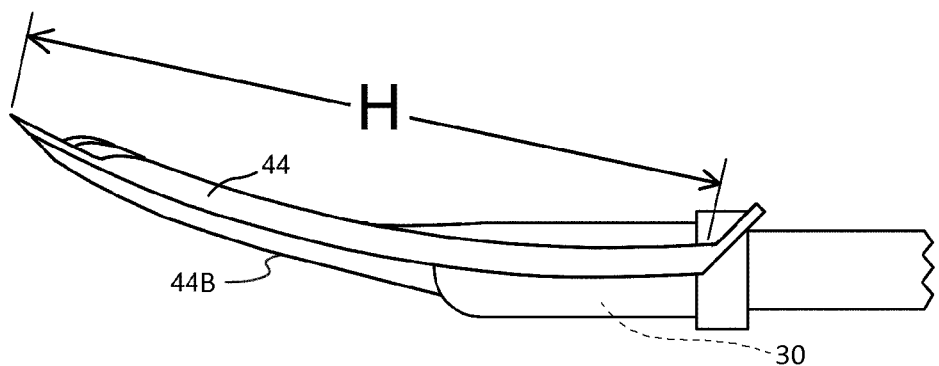

A rib and a corrugation may be combined. Referring again to FIG. 11A and FIG. 11B, for example, a forward projecting corrugation 46 may be combined with a rearward projecting rib 44 where, in a cross section through the blade taken in a plane generally normal to the direction of elongation of the corrugation and rib, the rib 44 extends from the back face of the blade and projects rearwardly therefrom and is disposed centrally to the corrugation and extends therealong. As illustrated in FIGS. 8B and 11B, one embodiment may have a rib 44B that is taller than the other ribs centrally positioned in the blade width direction and emanating from back face 20 of the blade, and upwardly terminating at its intersection with handle receiving socket 30. This demonstrates the earlier mentioned idea of a rib that can also function as a keel or wear feature because it can first contact the ground or pavement over which the blade is sliding and thus protect the blade to some degree from wearing down prematurely. A rib such as rib 44B can also offer extra rigidity to the blade against stress and deflection due to its greater size and also because it offers a convenient structural tie into the socket portion of the blade.

Side Wall

Figure 12:
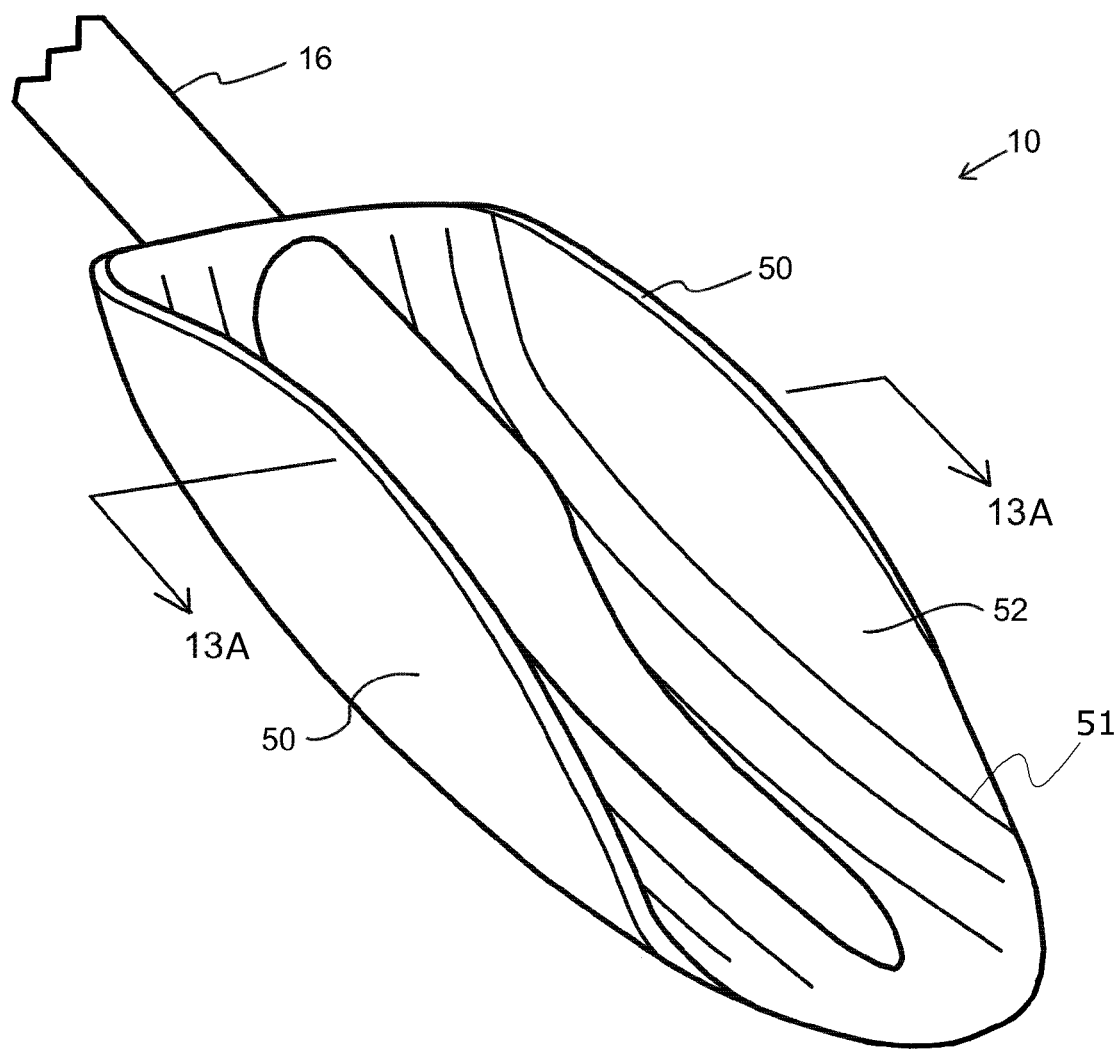
FIG. 12 shows a blade embodiment having side walls.

Referring to FIG. 12, Blade Portion 10 can further comprise a side wall portion, or side wall 50, which is a rib-like, wing-like, or fence-like element that can project forwardly or both forwardly and outwardly—that is, the side wall can project forwardly, at least to some degree within a range hereinbelow specified, from a side edge of the blade- and can further comprise means 51 for joining said side wall portion to said side edge of said blade portion along at least a portion of at least one of a said blade portion's said first and second side edges, each side wall having an inboard face 52 adjoining the corresponding front face 18 of the blade portion along at least a portion of a blade's side edge, so that the inboard face 52 is thereby oriented to face, to some degree, inwardly/inboardly toward the blade.

Figure 13A:
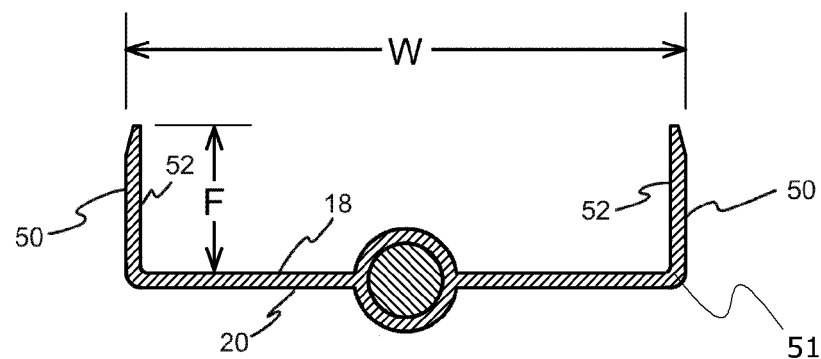
FIGS. 13A to 13B are sectional views taken from FIG. 12 showing blade embodiments having side walls that project forwardly and perpendicularly away from a blade.
Figure 13B:
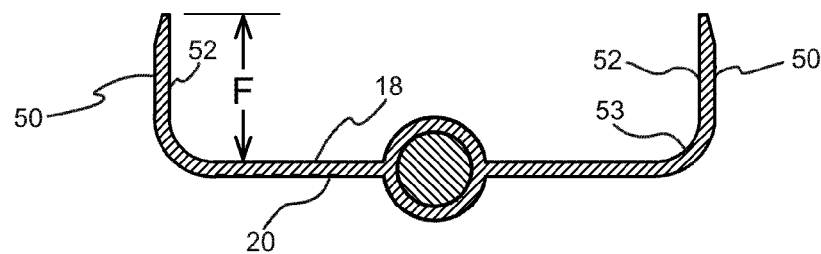

Referring to FIGS. 13A and 13B, in one embodiment a side wall 50 can project forwardly in a direction approximately normal to the blade width direction. Referring to FIG. 13A, a side wall height F can be defined as the maximum inboard height, F, of the inboard face 52 of the side wall 50, the direction of measure of the side wall height being oriented approximately perpendicular to the blade width W direction when viewed in any cross sectional plane or station oriented approximately normal to the blade height direction.

Referring to FIG. 13B, in another embodiment, the inboard face of a side wall 50 adjoining the front face portion of a blade portion can comprise a concave arcuate fillet portion 53 that forms a concave arcuate fillet profile between the front face of the blade and adjoining inboard face of a side wall when viewed in any cross sectional plane or station oriented approximately normal to the blade height direction. To clarify in this case, a side wall height F can again be defined as the maximum inboard height of the inboard face of the side wall including the arcuate fillet portion, the direction of measure of the side wall height being oriented approximately perpendicular to the blade width direction when viewed in any cross sectional plane or station oriented approximately normal to the blade height direction. In addition, to clarify the Width, W, of the blade in any cross section taken approximately normal to the blade height direction is again the maximum extent of the blade portion in the blade width direction to include any side wall portions.

Figure 14A:
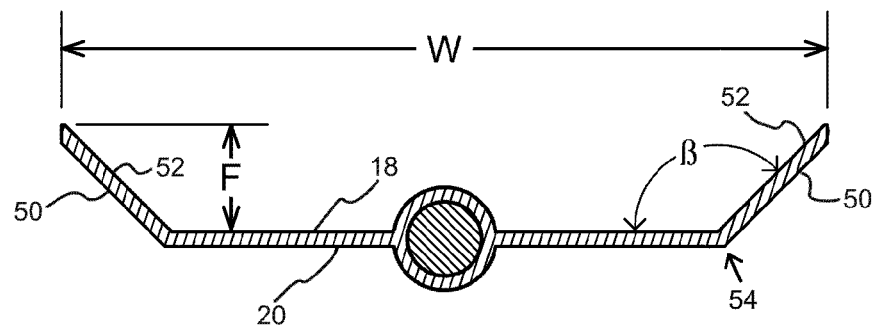
FIGS. 14A to 14B are sectional views corresponding to FIGS. 13A and 13B showing blade embodiments having side walls that project both forwardly and outwardly away from a blade.
Figure 14B:
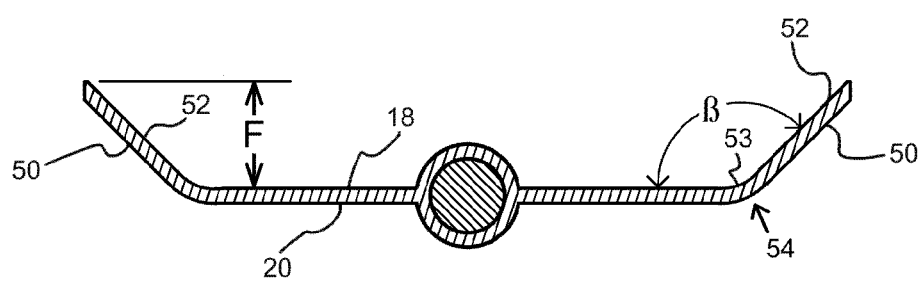

Referring to FIGS. 14A and 14B, in another embodiment, a side wall 50 can also be made to project or extend forwardly, and also outwardly away from the central portion of the blade. Here the inboard face 52 of the side wall forms an outward bend 54 of angle #, depicted in FIGS. 14A and 14B, wherein said angle β can range from approximately a right angle to an obtuse angle, and which angle β is the minimum angle between the inboard face 52 of the side wall and front face of said blade portion there adjoining when said blade portion is viewed in any cross sectional station or plane approximately normal to said blade height direction. This angle β can vary between about 90 and 180 degrees. Configurations are also possible wherein the angle β does not have to be constant for a side wall from height-wise station to station, but rather can be the same or different at different height-wise stations of the side wall when viewed in any cross sectional plane or station oriented approximately normal to the blade height direction.

Referring again to FIG. 14B, in one embodiment, the inboard face 52 of a side wall 50 adjoining the front face portion of a blade portion can comprise a concave arcuate fillet portion 53 that forms a concave arcuate fillet between the front face of the blade and adjoining inboard face of a side wall. To clarify in this case, a side wall height F can again be defined as the maximum inboard height of the inboard face of the side wall, to include the arcuate fillet portion, the direction of measure of the side wall height being oriented approximately perpendicular to the blade width direction when viewed in any cross sectional plane or station oriented approximately normal to the blade height direction.

FIGS. 13A, 13B, 14A, and 14B are also exemplary illustrations of one embodiment for the means 51 for joining a side wall portion to a side edge of a blade in which the blade and sidewall may be integrally molded or formed as one piece, so the side wall is an integral extension of the blade material. Such a one-piece construction might result for a one-piece blade molded of a plastic, or of a composite, or the blade and one or more side walls can be formed out of a single metal sheet such as a roll-formed or stamped sheet metal blade. A multitude of other side wall constructions are possible.

Multi-piece constructions (not illustrated) are also possible such as attaching a separate plate or fence piece to the side edge of a blade by employing an adhesive or heat induced (fusion) bond. Thus, means for joining 51 may include, but are not limited to, integrally molding, integrally machining, roll forming, stamping, screwing, pinning, adhesive bonding, fusion bonding, interlocking, any combination of these joining means.

Note that the configurations shown in FIGS. 13A and 13B are special cases of those of FIGS. 14A and 14B, respectively, wherein for FIGS. 13A and 13B, the angle #P is about 90 degrees; that is, angle #forms approximately a right angle in the configurations shown in FIGS. 13A and 13B. Furthermore, the configuration of FIG. 14A is a special case of that of FIG. 14B where, in FIG. 14A, the size of the fillet is vanishingly small. It should be noted that the case of a vanishingly small, or at least sufficiently minute, fillet really represents a sharp, or relatively sharp, re-entrant corner as depicted in FIGS. 13A and 14A, and such corners, while generally may not be a hindrance to the blade function, are still generally to be avoided especially in the manufacture of one-piece blade constructions of, say, a molded plastic, because high stresses can exist at the sharp corner which can tend to form a crack in the blade material along the corner. Such stresses can result from the molding process or as a result of mechanical stresses imposed on such a blade in service.

A side wall can also function to help guide and cradle and direct a charge so that it can freely move upwardly or downwardly along the front face of the blade and at the same time prevent or discourage some or all a charge from moving sideways, thus helping to prevent some or all of a charge from sliding toward or off the side edges of the blade. In a manual plowing or pusher plowing mode as described earlier, a side wall can aid a charge in moving in a direction more uniformly ahead of and forward of a blade and thus discourage or prevent sideways motion through the air of some or parts of an airborne charge as it is launched. A side wall can also function to stiffen, or reinforce, the blade against undue flexure.

Other blade stiffening, or reinforcing, means may be employed such as, for example, diagonally oriented rearward projecting stiffening ribs. All of these and other features, that is, corrugations, ribs, side walls, are optionally employable as embodiments and their presence or absence should not be construed to limit the scope of any embodiment.

Particular Embodiments and Field Test Models Described

In one embodiment, the snow oar can comprise a one-piece molded plastic blade portion having an overall height, H, of between about 254 and 318 mm (10 and 12 ½ inches), an overall width, W, of between about 101 and 242 mm (4 and 9½ inches), and a blade depth of curvature D of between about 12 and 38 mm (0.5 and 1.5 inches), and can comprise a handle made of solid pine wood of circular cross section having a diameter d for gripping of between about 25 and 35 mm (1 and 1.375 inches) and a length, L, of between about 1397 and 1900 mm (55 and 75 inches). In a further embodiment, the snow oar can comprise a blade having the above ranges of blade and handle dimensions and in addition comprises a deflector flange, with a relatively abrupt corner type forward bend, that is integrally molded with the blade portion and for which the deflector flange length E is in the range of between about 12 and 50 mm (0.5 and 2 inches) and for which the forward bend angle θ is between about 120 and 150 degrees.

Field test models of snow oars were built to a number of embodiments. One embodiment of a field test model comprises a one-piece molded plastic blade having a blade height, H, of about 305 mm (12 inches), a blade width, W, of about 216 mm (8.5 inches), a blade depth of curvature D of about 32 mm (1.25 inches), and a handle made of solid pine wood of circular cross section having a uniform diameter d for gripping of about 30 mm (1.18 inches) and a length, L, of about 1,650 mm (65 inches). One embodiment further comprises a deflector flange with a length E of about 38 mm (1½ inches) integrally molded with the blade and formed along substantially the entire trailing edge of the blade and relatively abruptly angled forward relative to the blade forming an obtuse angle θ of approximately 135 degrees between the deflector flange's front face and the adjacent front face of the blade (the deflector flange comprised a small fillet portion representing less than about 0.1 inches of the length E). One test model embodiment further comprised a wooden knob affixed to the uppermost end of the upper end portion of the handle portion, the wooden knob having a maximum diameter of 51 mm (2 inches) measured in a plane oriented approximately perpendicular to the handle length direction and having a length measured in the handle length direction of about 25.4 mm (1 inch) and which purpose was to act as a safety stop so that if the handle of the snow oar implement were to begin to slide through or away from the User's hands during operation of the implement, the knob, by virtue of its relatively large diameter compared to that of the handle, was intended to serve to arrest the handle's sliding motion against the User's hands and thus aid in preventing the User engaged in operating the implement from inadvertently "throwing" the snow oar implement away from the User. The wooden knob also could act as a hand-hold point for gripping the handle at the upper end, especially useful when operating the implement in a pusher plowing mode described previously. The above described field test models, with the mentioned variations, were constructed more or less as depicted in FIG. 10. These field test model dimensions can be contrasted against those of a conventional snow shovel having a blade width of about 450 mm (17.75 inches), that is, about twice that of the widest snow oar test model embodiments above described, and having a handle length of about 787 mm (31 inches), that is about half that of test model embodiments above described.

One field test model embodiment was as the first-described field test model embodiment above, except the blade portion further comprised a rounded leading edge and one side wall per side edge, each side wall extending along and adjoining along substantially their entire respective adjacent side edges of the blade. Each side wall projected forwardly with a maximum side wall height, F, of approximately 76 mm (3 inches) measured at approximately central in the blade height direction of each of the blade's side walls. The forward projection of each side wall tapered to substantially a zero forward projection as each side wall neared the lower edge of the blade and also as each side wall neared, and joined with, the deflector flanges in the neighborhood of the trailing edge of the blade. The side walls were formed of 0.031 inch thick flat sheet aluminum fastened with screws to an integrally molded rearward projecting rib portion running along each side edge of the blade. A non-slip PTFE film adhesive-backed tape was applied on the inboard faces of each aluminum side wall with the intention that the film would aid in preventing snow or ice from adhering to the side walls and offer low sliding friction to snow or ice. The blade of this unit appeared approximately as depicted in FIG. 12.

The field test unit with the aluminum side walls just described above was also employed in clearing deep snow as described, both with the side walls attached and also with the side walls removed. This unit, like the others, performed well in deep snow and when employing a more or less rearward manual plowing method and whether the handle was held angled close in to the User or was angled out considerably so the blade was positioned much further away from the user. Since the leading edge was rounded this unit, even when angled out relatively far from the User as described, and in this operating mode could fairly cleanly scrape snow down to the hard surface underlying the snow which may afford Users some additional versatility as to how they may usefully operate this implement, and for some Users the ability to angle out the handle in this way may offer a more ergonomic or comfortable mode of use for them.

Two other field test models having narrower width blades, one of about 114 mm (4.5 inches) and also one of about 152 mm (6 inches), were also employed in manual plowing of relatively deep snow of about 254 to 305 mm (10 to 12 inches) depth. The unit with the 144 mm (4.5 inch) wide blade was otherwise similar to the side walled one described in the previous paragraph except that it also possessed a relatively straight, as opposed to a round leading edge. It was initially found that this 114 mm (4.5 inch) wide blade without the side walls was as apt to split the snow it was driven into so that a large portion of the charge would slide or be deflected off the side edges of the blade rather than be sent up and ahead of the blade. This was rectified by attaching the side walls of flat aluminum sheets, similar to the ones previously described, to each of the blade's two side edges, the side walls running up and down the length of the side edges except for about one-inch length of side edge portions adjacent to the leading edge, and the side walls having a maximum height of about 76 mm (3 inches). PTFE film adhesive tape was also applied to the inboard faces of these side walls to provide a non-stick sliding surface. Yet another test implement that employed a 152 mm (6 inch) wide blade possessed side walls which were integrally molded by roll forming the heat-softened plastic blade along each side edge of the plastic blade approximately as depicted in FIG. 13B. For this unit the side walls were only about 25 mm (1 inches) tall and ran the length of each side edge. This unit performed well in relatively deep snow as built. Given the above described field experiences, at least for blade units of the height as described above, the need for employing side walls and the dimensioning thereof are to some extent related to the width of the blade. A blade with a width equal or larger than perhaps about 150 mm (6 inches) may still benefit from the sidewalls to some degree by, as mentioned earlier, aiding all or most of a launched charge to move more forwardly through the air as opposed to some of the charge, especially portions near the side edges, from diverging from the forward direction with some component of sideways motion as the charge is launched ahead of the blade.

Operation

Background—Traditional Snow Shovel

As mentioned previously, a traditional short-handled shovel has a wide blade that interferes with a User's body when attempting to effect rearward (oar-like) or side wise (oar- or sweeping-like) motions previously described. This manner of operation is not typically employed when using a traditional snow shovel. But assume a traditional snow shovel were so employed. First, short handles, and possibly bent (i.e. Z-jogged) handles, make such maneuvers awkward at best. Moreover, drawing a wide-bladed snow shovel face-on into fallen snow would likely require a very large manual force to be applied, especially for deep snow. To limit the necessary "manual plowing" force required, the User could compensate for the wide blade by positioning the blade so that it merely skims the top off fallen snow. This could work to reduce the manual force required, but with a wide blade it is difficult to prevent one or the other lower edge corners of the blade impacting the snow unevenly, and the impact on one or the other of the outboard corners of the wide blade tends to impose a large torque on the blade and handle causing the blade and handle to twist about the handle axis—posing additional strains and awkwardness on the part of the User who now must work to keep the shovel's handle and blade from twisting or spinning around in their hands. In addition, consistent control of the depth of the skim cut is awkward and difficult. A skimming method may be employed with the disclosed snow oar implement as well, and in this case, by virtue of the relative narrowness of the blade, it is not as susceptible to uneven impacts, and not as susceptible to a corner or side impact imposing relatively large torques on the handle tending to twist it (the available moment arm through which such a torque could be developed being smaller due to the narrower width of the blade and for some embodiments described previously due to the lower corners of the blade being rounded or chamfered off). Moreover, also due to the narrowness of the snow oar's blade, the User now has the option to skim snow with the side of the blade, and again, the narrowness of the blade is not as susceptible to developing large torques that either spin the implement or impose additional strains on the User reacting to these side loadings.

The User of a traditional wide-bladed shovel could avoid bodily interference with a wide blade in sideways or rearward plowing motions by angling out the handle to keep the blade away from the operator; however, this then likely means an inboard portion or corner of the wide blade is virtually guaranteed to first impact the snow resulting in the aforementioned tendency for the blade and handle to twist in the operator's hands with each pass. Additionally, at least for traditional short handled shovels, the relatively short handle will limit the amount of angling out that can be given to the handle, and furthermore the relatively short handle will not be suitable for working in an upright standing stance, and the short handle will not furnish the necessary stability and leverage the operator needs to adequately control and impart sufficient velocity to the blade.

Attempting to perform a rapid modified pusher motion, as previously described, with a short-handled wide-bladed type of traditional pusher or snow shovel means when drawing the short handle back, the blade will likely come back enough to interfere with the User's feet and legs (body) and hinder the amount of pull back, plus, again due to the short handle, the User will have to stoop or bend down to achieve the shallow blade angle limiting any overhand or side-armed arcing, swinging arm motion which, if performed would be awkward at best. Alternatively, the User could remain upright and hold the handle downward at a shallow angle using an under arm/hand position. In either case the distance, and perhaps also the speed, which the User could employ to drive the blade along would be limited by the short handle, thus increasing the need to walk behind to make up the distance, and the awkwardness of the motions would likely result in much reduced efficiency, and more walking may increase risk of the User slipping and thus may also decrease the safety of the operation.

Operation—Snow Oar

Figure 15A:
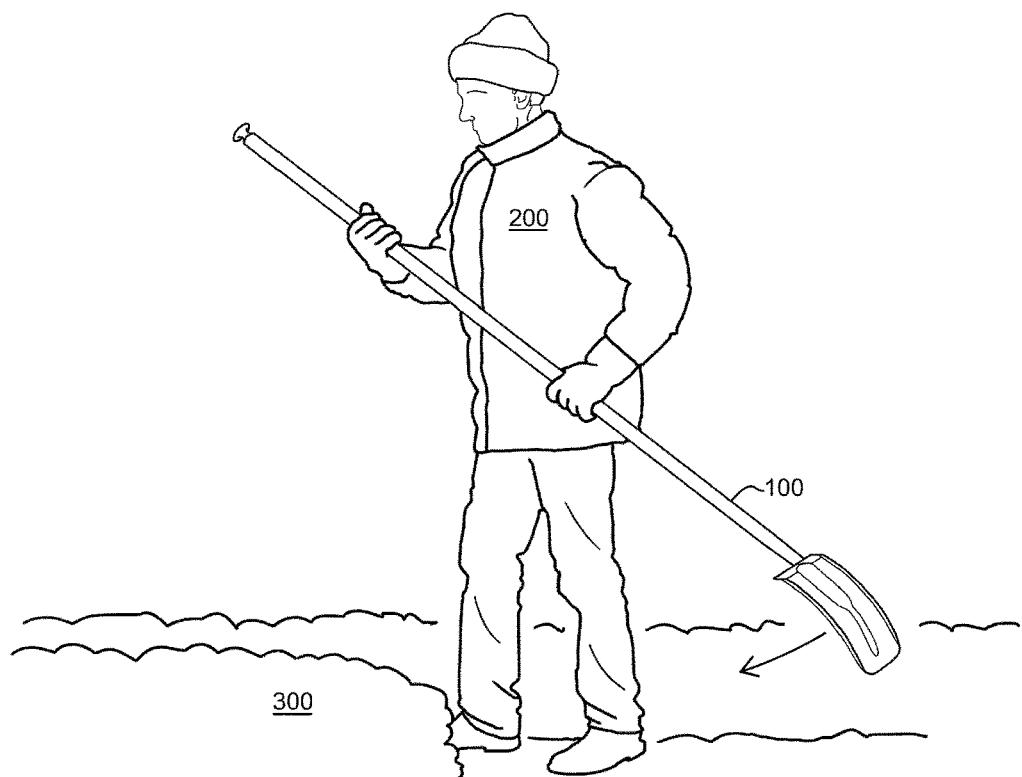
FIGS. 15A to 15B depict a forward manual plowing operation with a snow oar.
Figure 15B:
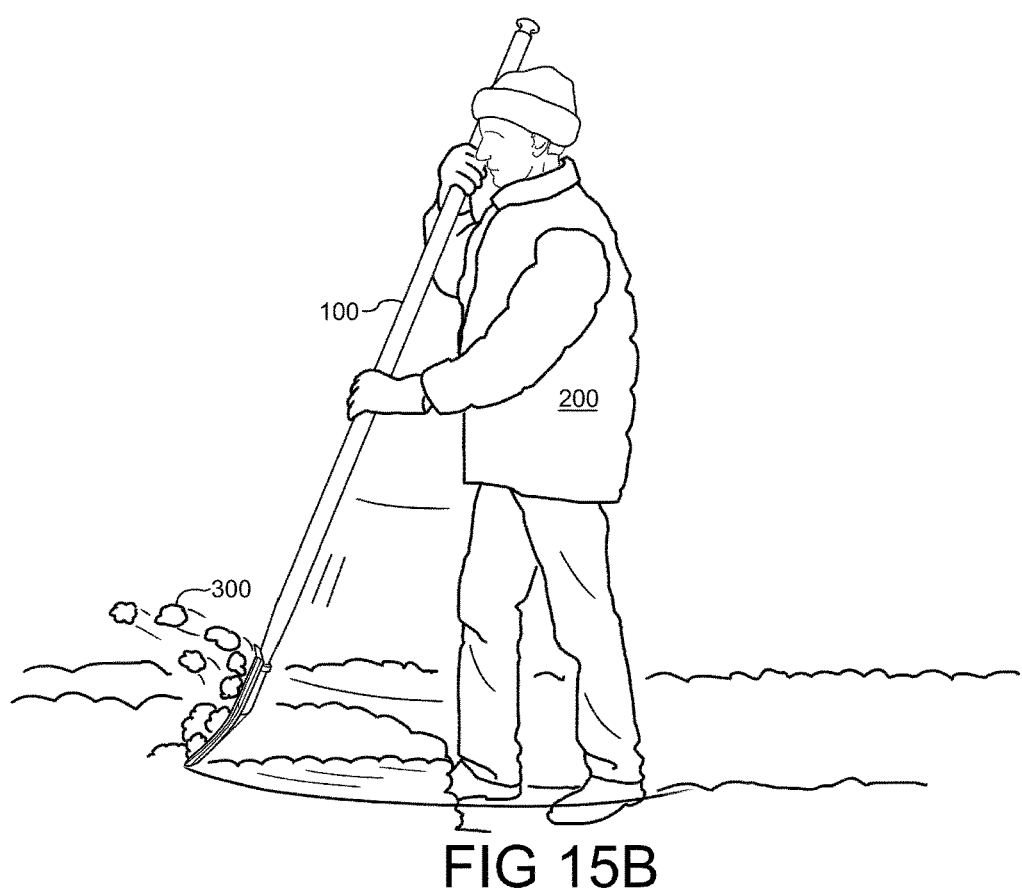

In one mode of operation, snow oar implement 100 can be grasped with two hands in a manner similar to grasping a hand-held "kitchen" broom (as opposed to a push-broom). Snow oar 100 can then be operated by User 200 to manually plow, propel, send, launch, eject, fling, or otherwise move charge of snow, slush, or ice 300 in, for example, a forward direction (that is, a direction in front or ahead of User 200) which will tend to move or send snow 300 in a direction ahead of User 200. With reference to FIGS. 15A and 15B, one example is shown where User 200 can grasp the handle with both hands in an "overhand grip" (i.e., wherein thumb side of each hand is facing away from shovel end) as if sweeping forwardly, that is, using an upper hand position and lower hand position with some spacing between the hands. User 200 can rotate the handle so the front face of the blade is facing more or less in the User's forward direction, and User 200 then can manipulate the handle so the blade is swung, swept, drawn, or otherwise driven approximately face-on into fallen snow, slush or ice in front of and ahead of User 200, and by also imparting perhaps a slight upward-sweeping blade motion the snow can be sent in a forward trajectory through the air ahead of User 200 toward a desired resting spot.

In a similar way, snow 300 can be sent both forward and at an angle toward one side or the other by User 200 manipulating handle 12 so blade 10 faces and can be swung, swept, drawn, or otherwise driven in a direction that is to some degree angled off the forward direction toward one side or the other ahead of User 200. It is again the relative narrowness of the blade and the elongated handle, compared to the traditional snow shovel, that allows User 200 to manually swing, sweep, pull, push or otherwise draw or drive the blade more or less face-on into fallen snow, slush, or ice in one relatively continuous motion that in the process imparts velocity and momentum to the charge of snow so that it then can follow a trajectory through the air toward a relatively distant resting spot. Moreover, unlike in a traditional shoveling technique, since the snow oar's blade does not first need to be lowered face up and shoved or shoveled under and into a charge of snow, a User can remain in a relatively upright standing and stationary or semi-stationary stance when operating the snow oar in this way. With each swing or pass of the blade, additional snow can then be cleared away.

Figure 16A:
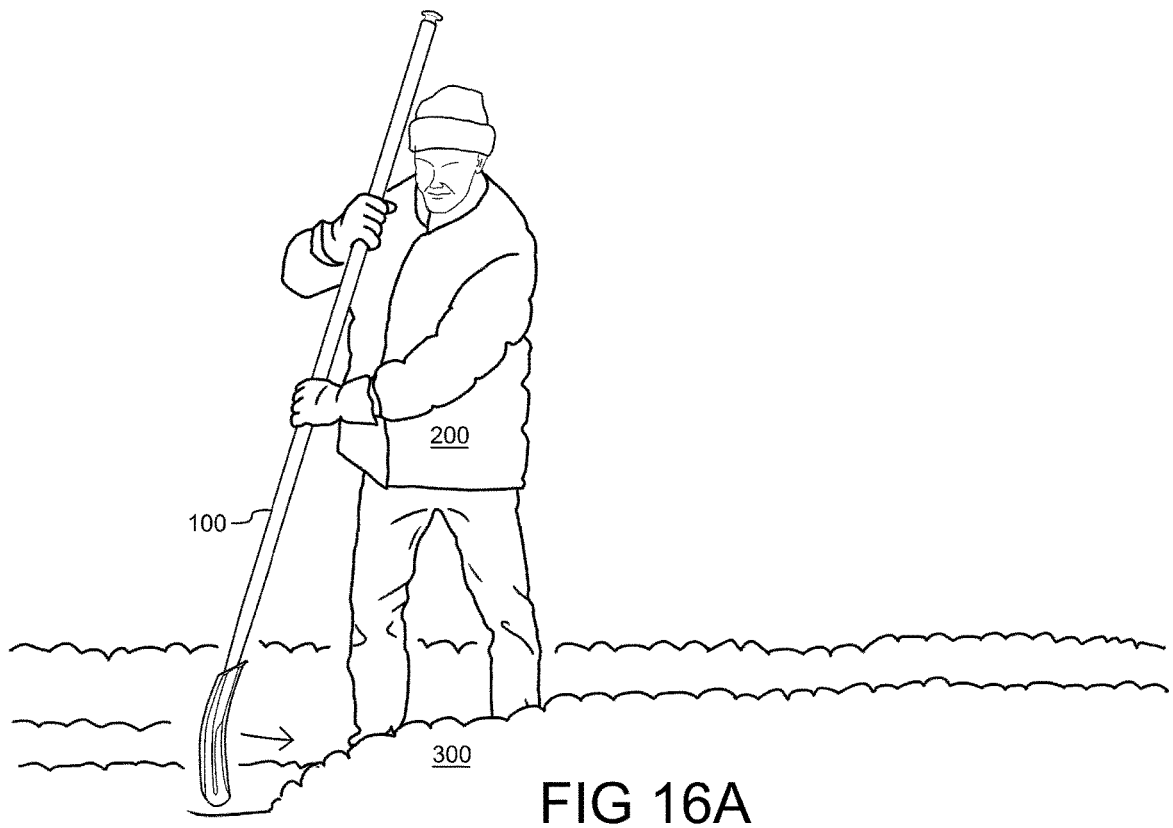
FIGS. 16A to 16B depict a side wise manual plowing operation with a snow oar.
Figure 16B:
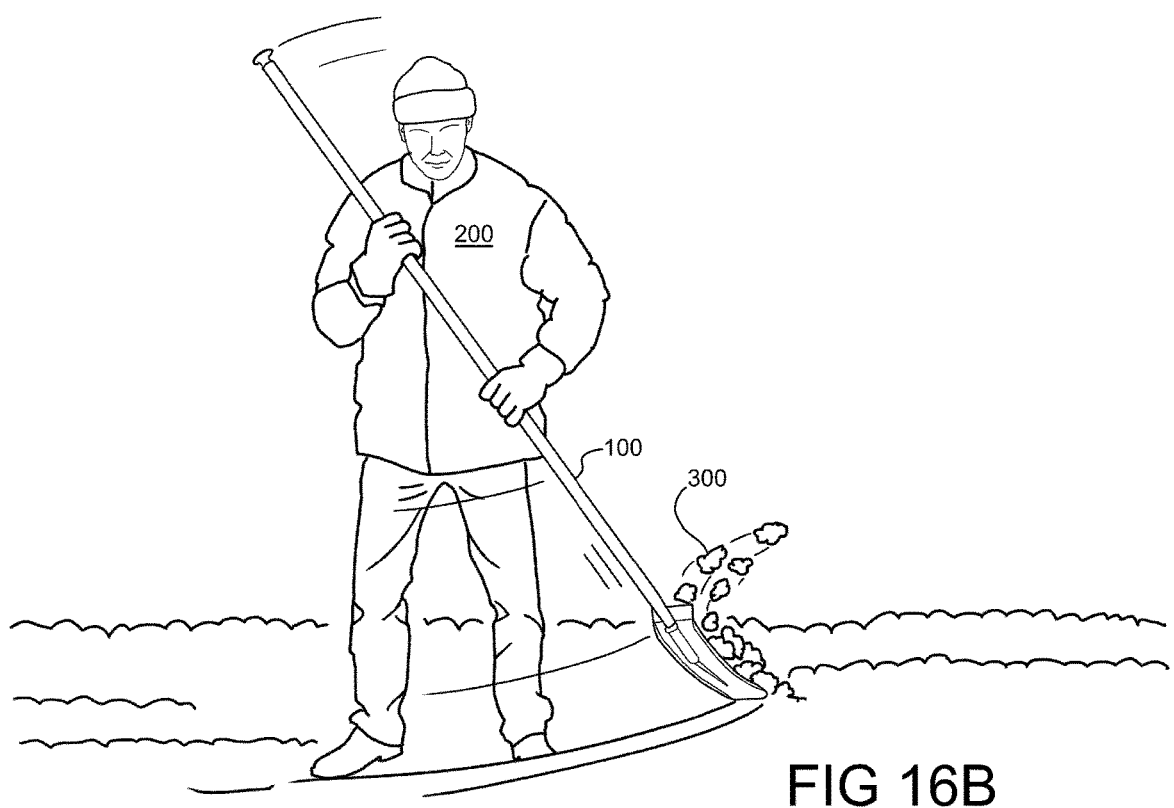

With reference to FIGS. 16A and 16B, User 200 can also operate the snow oar in such a way as to send or move snow 300 in a more or less sideways direction relative to User 200 by manipulating handle 12 to rotate front face 18 of the blade 10 to point out approximately toward a User's right or left and again User 200 can swing, sweep, or otherwise draw or drive blade 10 more or less face-on into fallen snow, slush, or ice 300 in this direction to send the snow in this direction.

Figure 17A:
FIGS. 17A to 17B depict a rearward manual plowing operation with a snow oar.
Figure 17B:
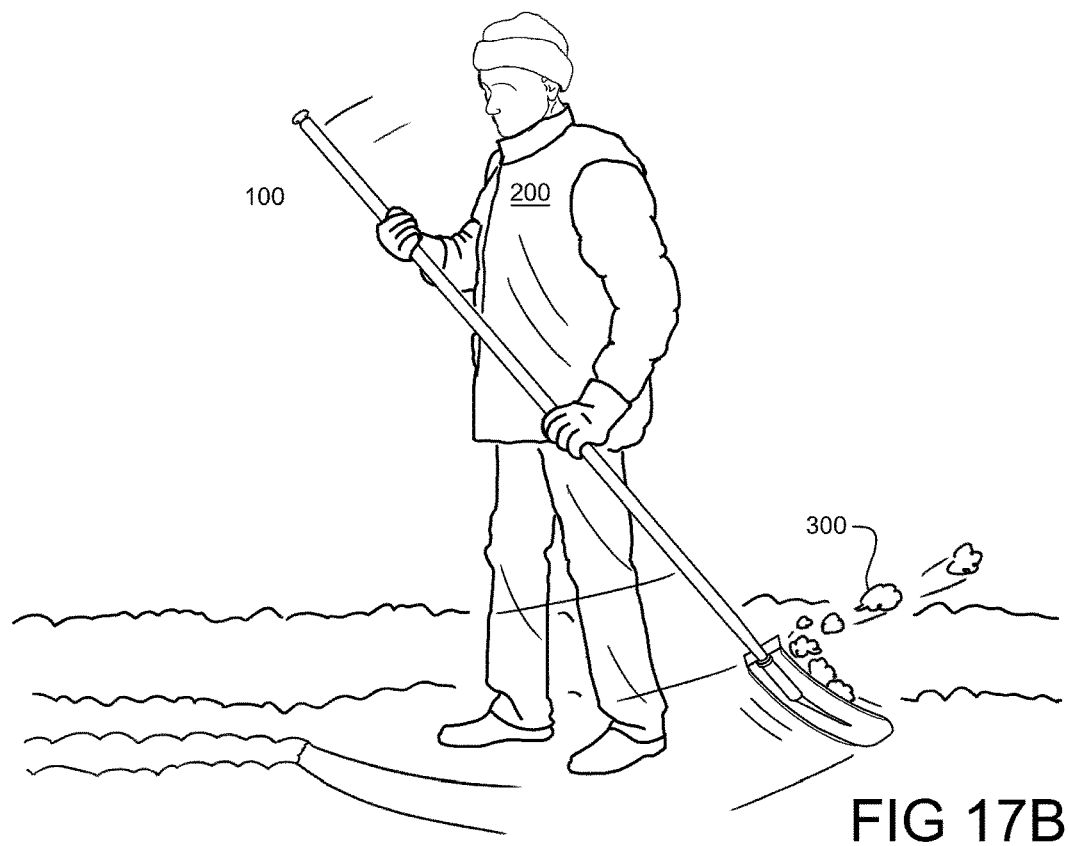

A User can also send snow in both a sideways and rearward direction by pointing the front face of the blade in a more or less rearward-angled direction, then the User can manipulate the handle to pull, swing, sweep, or otherwise draw or drive the blade more or less face-on into the snow in this same direction and thus can impart a sideways and rearward trajectory to the snow sending it through the air toward a distant desired resting spot. With reference to FIGS. 17A and 17B, similarly User 200 can move snow 300 in a more or less rearward direction depending on the degree of rearward angle imparted by User 200 to both face blade 10 in that direction and manually pull, swing, sweep, or otherwise draw or drive blade 10 into the fallen snow, slush, or ice 300 in the same direction.

Generally, it has been found when moving the blade sideways or rearwards or some combination of the two, that one ergonomic position for the User's hands is that the User's hand on the User's side that is in the direction the snow oar is to be swept or pulled, grasps the handle at the lower hand position. This lower positioned hand is then employed to pull the handle to that side and/or rearward. The opposite hand grasps the handle at the upper hand position. This is similar to the hand position when sweeping a kitchen broom to the side or rearward, and also somewhat similar to the hand position a canoeist employs when pulling an oar back through the water to propel the canoe forward.

Figure 18A:
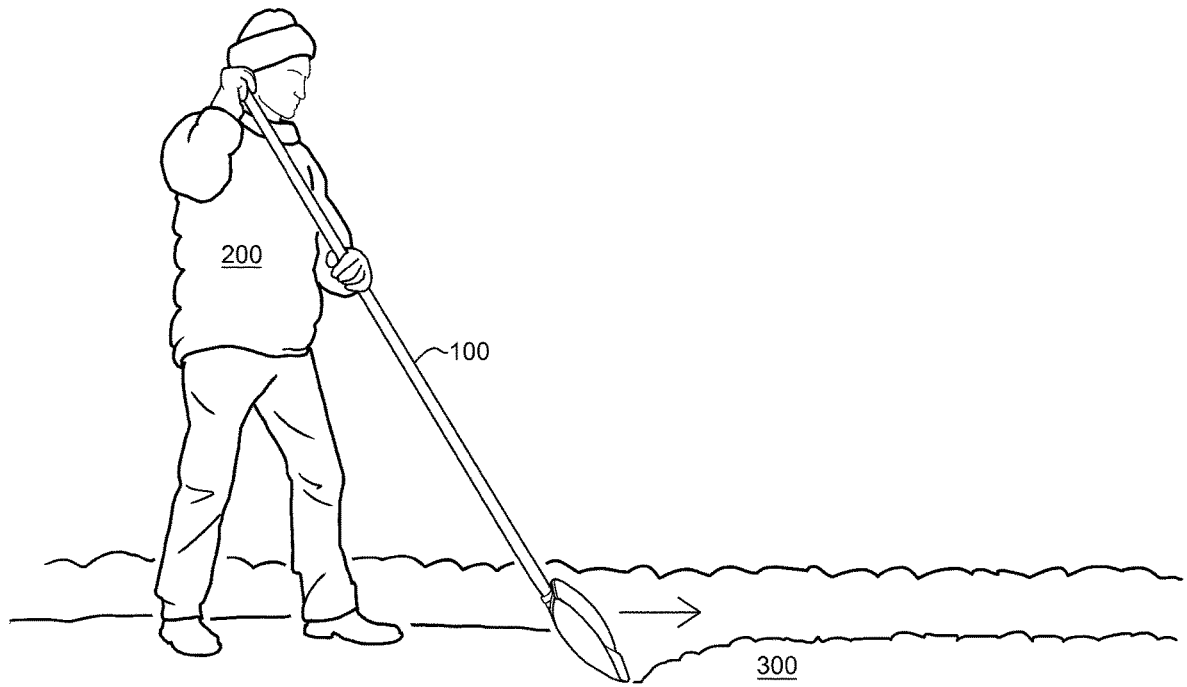
FIGS. 18A to 18C depict progressive phases of a pusher plowing operation with a snow oar.
Figure 18B:
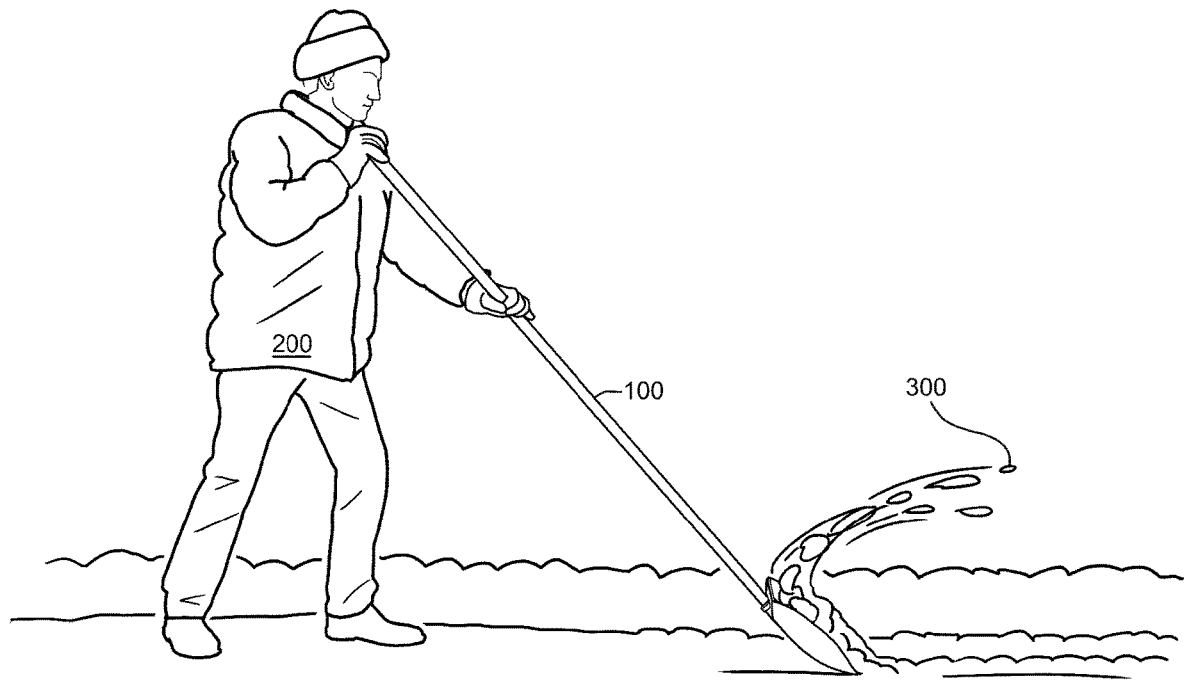
Figure 18C:
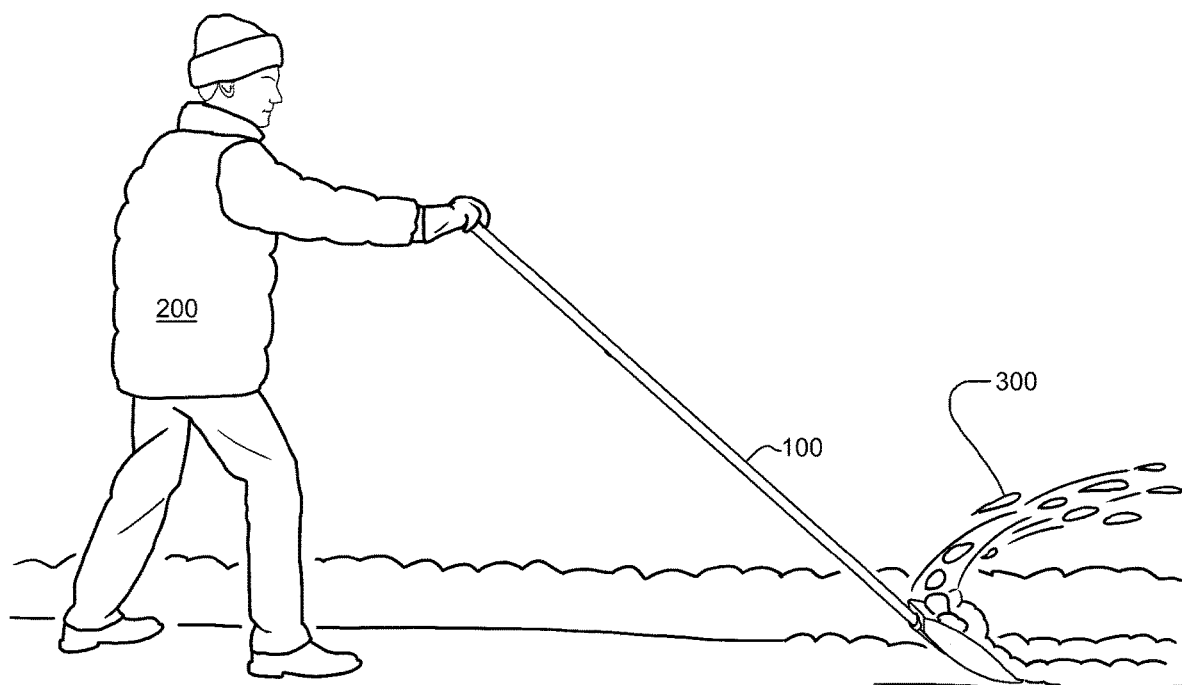

With reference to FIGS. 18A, 18B and 18C, User 200 can also operate snow oar 100 in modified pusher mode, by typically grasping handle 12 with at least one hand near or at handle upper end 14, or grasping a knob 34 (obscured by User 200 right hand; see FIG. 1) or handle-hold or grip attached to, or near, the handle upper end 14, and holding the handle so the blade will be oriented in a tilted-back orientation so it's angled more shallowly to the ground. Then User 200 can employ a relatively large linear or arcing swinging or pushing motion of the driving hands or hand to drive implement blade 10 relatively rapidly forwardly into fallen snow, slush, or ice so that charge 300 rides up the front face of the moving blade and depending on the speed imparted to the blade, charge 300 can be either moved ahead of the blade to a desired spot, or if a more rapid motion us used, charge 300 can be ejected forward and upward ahead of blade 10 and User 200, and charge 300 can again be sent in a trajectory through the air toward a desired resting spot. This modified pusher mode can also be performed in a both forward and angle off to one side or other of a User, or even in a sideways direction relative to User 200. A deflector flange feature previously described can enhance the upward and forward motion of the charge and thereby aid in deflecting or urging the charge in a more upward and forward direction and speed which can send the charge further away despite the blade being tilted backward. Most of the motion or momentum imparted to the charge can be imparted by the User's arm and upper body motion while the User can remain in a stationary or semi-stationary upright stance, rather than by User having to impart the motion by walking the implement along.

A User has the flexibility to manipulate the blade in various other advantageous ways. For example, if clearing snow on steps with parapet side walls, a User can impart more of an upward trajectory to the snow by so manipulating the handle and blade so that the trajectory of the snow will clear the walls.

The implement can permit a User to clear steps from the top down, for example going from the porch to the sidewalk, while remaining in a more or less upright stance. The snow oar can also be operated in a traditional shoveling mode as well, which helps in clearing detailed areas where it makes more sense to employ a traditional "shoveling" method.

Performing the above described processes using a traditional snow shovel, having a short handle and a relatively wide blade, would be awkward at best and in some cases not practical or possible due to the enormous manual force that would likely be required to draw or drive such a wide blade face-on through snow, and as well for rearward motions where the wideness of the blade would increase the chance the blade will strike the User's legs.

The physical characteristics of the snow oar also make it convenient to employ in various other ways. For example, it is useful to owners of large vehicles such as SUVs for clearing snow and ice off the front hood and windshield of the vehicle which otherwise is a chore made difficult especially in deep snow, due to the great height and width of the vehicles.

Conclusions, Ramifications, and Scope

While the above descriptions of structure and operation of the snow oar implement furnish a number of specific examples, these are offered merely as some illustrative examples among many, and therefore the examples and descriptions offered should not be construed as defining limitations on the scope of this disclosure. Other examples and variations on those given are possible. For example, there are other materials and other methods of manufacture than those suggested, with which to make the implement. Even materials and manufacturing methods that do not yet exist might be applicable to the manufacture of this implement. Other methods than, or in addition to, those suggested for stiffening and reinforcing the blade against undue flexure and stress can be employed, if even needed. Variations in the shape of the blade, including the shape of side walls and deflector flanges, can be employed. The shape of side walls and deflector flange can likely be varied considerably and still provide their function. I have just showed one or more embodiments among potentially many. In some cases efficiencies in fabricability may drive certain shapes or details.

The implement can be made of one material, or of two or more materials, or as an integral unit, for example as a one-piece molded plastic implement which includes both blade and handle (e.g. see U.S. Pat. No. 4,280,727 to Germain, 1981, incorporated herein by reference), or by materials being suitably joined or connected by any suitable means. The implement could employ a detachable blade, for example an implement with a set of interchangeable detachable blades, with different blades sized or otherwise formed to suit particular conditions. The upper end portion of the handle can be capped with a knob or other protrusion or flare, which might aid in preventing a User inadvertently "throwing" the implement, or with a traditional "Y" handled shovel type hand grasp, or can be left as a plain-ended handle. While some figures show the handle portion positioned so it "splits" the blade portion in a direction more or less perpendicular to the blade height and width direction, other positions of the handle portion relative to blade portion are possible such as being spaced further rearwardly relative to the blade portion or spaced further forwardly relative to the front face of the blade portion or it could be positioned at an intermediate position between the more forward and rearward positions. A User is not constrained to employ the implement with just one face-on manual plowing, or modified pusher plowing method of operation as earlier described; rather, the implement offers versatility in that other orientations of the blade and handle during manual plowing use can be employed by a User, if desired, and depending on conditions might be more suitable than the face-on manual plowing or pusher plowing described. For example, especially in snow that is not too deep, in field testing it has been found beneficial in some cases to increase efficiency and speed of snow removal, that the manual plowing can also also be employed with the handle rotated more or less backward, opposite the forward direction of the blade's motion and relative to the blade, so that the front face of the blade approaches the snow with more of a back-angle, that is the upper or trailing edge of the blade is tilted back and down so the blade's face approaches the snow at an oblique or inclined orientation or angle as it approaches the fallen snow. Here, the blade is not necessarily sliding along the pavement as in the pusher plowing mode, and likewise is not being driven face on into snow, slush or ice, but is operated somewhat in between these two modes. Finally, the handle can be made in releasably coupled sections. This can for example permit the implement to be broken down into shorter lengths for convenient storage, transporting, and shipping. Accordingly, it is to be understood that variations and modifications in the construction, form, and arrangement of one or more elements are possible, as are variations in the modes of operating the implement, without departing from the spirit and scope represented by this disclosure.

I claim:

1. A method for manually clearing snow and the like comprising performing one or more steps of manual plowing and modified pusher plowing utilizing an implement comprising:

an elongated handle comprising an upper end and a lower end, the handle defining a handle length direction along its elongation axis;

a blade having:
  a blade height direction oriented upwardly and downwardly between an upper edge and a lower edge of said blade,
  a front face and a back face, said front face and said back face bounded upwardly and downwardly by the lower edge and by the upper edge, said front face being, in the absence of a load, arcuately curved in said blade height direction between said upper edge and said lower edge so that said front face is concave,
  a blade width direction running substantially transverse to said blade height direction and substantially parallel to said front face of said blade;
  a first side edge and a second side edge,
  handle attachment means to secure said lower end of said handle to said blade proximate to said trailing edge of said blade and centrally in the blade width direction, whereby said handle thereby extends upwardly and away from said blade in a direction substantially parallel to said blade height direction,
  a blade height defined as a maximum extent of said blade between said upper edge and said lower edge in said blade height direction,
  a blade width defined as a maximum extent of said blade between said first side edge and second side edge in said blade width direction,
  a blade depth of curvature defined as a maximum depth of the curvature of said front surface of said blade;

wherein said lower end of said elongated handle is attached to said blade with said handle attachment means;

wherein a handle length is defined as the length of the attached elongated handle measured from said upper edge of said blade to the furthest extent of said upper end of said handle portion;

wherein said handle length is in the range from about 1,397 to 1,900 mm;

wherein said blade height is in the range from about 254 to 318 mm;

wherein said blade width is in the range from about 101 to 242 mm;

wherein said blade depth of curvature is in the range from about 12 to 38 mm;

wherein said "manual plowing" comprises a user manually qrasping said handle with both hands in an overhand grip, manipulating said handle to orient said front face of said blade so said front face can be manually driven substantially face-on in a sweeping-like arc into said snow, and, while remaining in a semi-stationary upright stance, manipulating said handle with sufficient velocity to impart momentum and velocity to a charge of said snow causing it to be ejected ahead of, and upwardly from, said front face of said blade, thereby sending said charge ahead of said blade and in the general direction of said blade's motion toward and to a distant location; and wherein said "modified pusher plowing" comprises the user grasping said handle proximate to said upper end with at least one hand ("driving hand"), inclining said handle so the blade is tilted-back shallowly to a ground surface with lower edge thereon, and, while remaining in a semi-stationary upright stance, manually employing a linear or arcing swinging and pushing motion of the driving hand combined with upper body motion to drive the blade along said ground surface outwardly and away relatively rapidly into said snow so that said snow is ejected forward and upward ahead of the blade and sent in a trajectory toward and to a distant location.

2. The method of claim 1, wherein said blade further comprises a deflector flange disposed on said upper edge, said deflector flange having a front face portion,
- wherein said front face portion is angled forwardly relative to said front face of said blade, and extends upwardly and forwardly therefrom, whereby an obtuse forward bend angle is formed, being the minimum included angle between said below adjoining front face and said front face portion of said deflector flange when viewed in any cross sectional plane taken substantially normal to said blade width direction,
- wherein a deflector flange length is defined as a maximum surface length running upwardly and downwardly along said front face of said deflector flange portion in a cross sectional plane oriented substantially normal to said blade width direction,
- wherein said deflector flange maximum length is in the range from about 12 to 50 mm, and
- wherein said forward bend angle is in the range from about 120 to 150 degrees.

3. The method of claim 2, wherein said blade comprises plastic selected from the group consisting of an ethylene plastic, a blend that includes an ethylene plastic, polyethylene, polypropylene, polyvinyl chloride, polycarbonate, and a blend of at least two of these plastics.

4. The method of claim 3, wherein said handle attachment means comprises:
- a handle receiving socket positioned centrally in said blade width direction proximate to said upper edge so that said socket opens upwardly away from said blade portion, said handle receiving socket configured to receive by insertion said lower end of said handle; and
- handle securing means selected from the group consisting of screw, nail, pin, staple, threading, rivet, crimp, glue, weld, tack-weld, ratchet lock, detent, tension lock with spring loaded or tensioned locking pin, press fit, and detachable securing means.

5. The method of claim 4, wherein said handle comprises wood.

6. The method of claim 5, wherein said wood is white pine and wherein said handle comprises, in planes substantially perpendicular to said handle length direction, circular cross section diameters in the range of 25 to 35 mm.

7. The method of claim 4, wherein said handle comprises a material selected from the group consisting of tubular steel, tubular aluminum, wood.

8. The method of claim 7, wherein said blade further comprises at least two corrugations, said corrugations being integrally formed in said blade and each convexly forward projecting in said front face of said blade, and elongating substantially in the blade height direction, said corrugations being spaced apart in said blade width direction, each said corrugation extending between said lower edge and said upper edge, said corrugations tapering down in size, when viewed in any cross sectional plane or station oriented normal to said blade height direction, until vanishing near the lower edge of said blade and extending at least proximate to the upper edge.

9. The method of claim 1, wherein said blade further comprises:
- a side wall portion which projects forwardly from one of said first or second side edges, said side wall portion having an inboard face portion adjoining and angling inwardly toward said front face of said blade; and
- means for joining said side wall portion to said one of said first or second side edges;
- wherein said side wall portion has a side wall height defined as a maximum extent of said inboard face of said side wall portion when measured in a direction substantially normal to said blade width direction when viewed in a cross sectional plane oriented substantially normal to said blade height direction,
- wherein an outward bend angle is defined as the minimum angle formed between said inboard face portion and said front face of said blade when said blade is viewed in any cross sectional plane substantially normal to said blade height direction,
- wherein said side wall height is about 100 mm or less,
- wherein said outward bend is in the range from about 90 to about 180 degrees, and
- wherein said means for joining is selected from the group consisting of: integrally molding, integrally machining, roll forming, stamping, screwing, pinning, adhesive bonding, fusion bonding, interlocking, and any combination of these joining means.

10. The method of claim 9, wherein said blade further comprises a deflector flange disposed on said upper edge, said deflector flange having a front face portion,
- wherein said front face portion is angled forwardly relative to said front face of said blade, and extends upwardly and forwardly therefrom, whereby an obtuse forward bend angle is formed, being the minimum included angle between said below adjoining front face and said front face portion of said deflector flange when viewed in any cross sectional plane taken substantially normal to said blade width direction,
- wherein a deflector flange length is defined as a maximum surface length running upwardly and downwardly along said front face of said deflector flange portion in a cross sectional plane oriented substantially normal to said blade width direction,
- wherein said deflector flange maximum length is in the range from about 12 to 50 mm, and
- wherein said forward bend angle is in the range from about 120 to 150 degrees.

11. The method of claim 10, wherein said blade comprises plastic selected from the group consisting of an ethylene plastic, a blend that includes an ethylene plastic, polyethylene, polypropylene, polyvinyl chloride, polycarbonate, and a blend of at least two of these plastics.

12. The method of claim 11, wherein said handle attachment means comprises:
- a handle receiving socket positioned centrally in said blade width direction proximate to said upper edge so that said socket opens upwardly away from said blade portion, said handle receiving socket configured to receive by insertion said lower end of said handle; and
- handle securing means selected from the group consisting of screw, nail, pin, staple, threading, rivet, crimp, glue, weld, tack-weld, ratchet lock, detent, tension lock with spring loaded or tensioned locking pin, press fit, and detachable securing means.

13. The method of claim 12, wherein said handle comprises wood.

14. The method of claim 13, wherein said wood is white pine and wherein said handle comprises, in planes substantially perpendicular to said handle length direction, circular cross section diameters in the range of 25 to 35 mm.

15. The method of claim 12, wherein said handle comprises a material selected from the group consisting of tubular steel, tubular aluminum, wood.

16. The method of claim 15, wherein said blade further comprises at least two corrugations, said corrugations being integrally formed in said blade and each convexly forward projecting in said front face of said blade, and elongating substantially in the blade height direction, said corrugations being spaced apart in said blade width direction, each said corrugation extending between said lower edge and said upper edge, said corrugations tapering down in size, when viewed in any cross sectional plane or station oriented normal to said blade height direction, until vanishing near the lower edge of said blade and extending at least proximate to the upper edge.

17. The method for manually clearing snow or the like of claim 1, wherein, in manual plowing, the general direction of said blade's motion relative to the user is in a sideways direction or a rearward direction.

\* \* \* \* \*